(12) United States Patent
Nakahara et al.

(10) Patent No.: US 6,470,149 B1
(45) Date of Patent: Oct. 22, 2002

(54) DISTANCE MEASURING APPARATUS

(75) Inventors: Naoto Nakahara, Saitama (JP); Norio Numako, Tochigi (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 28 days.

(21) Appl. No.: 09/642,811

(22) Filed: Aug. 22, 2000

(30) Foreign Application Priority Data

Aug. 24, 1999 (JP) ............................................. 11-236996
Aug. 24, 1999 (JP) ............................................. 11-236997

(51) Int. Cl.[7] .............................. G03B 3/00; G03B 13/00
(52) U.S. Cl. ............................................. 396/89; 396/98
(58) Field of Search ............................ 396/89, 98, 102, 396/104, 120, 121, 125

(56) References Cited

U.S. PATENT DOCUMENTS 5,200,602 A * 4/1993 Ikebe et al. .............. 250/201.6

* cited by examiner

Primary Examiner—Russell Adams
Assistant Examiner—Arthur A Smith
(74) Attorney, Agent, or Firm—Greenblum & Bernstein, P.L.C.

(57) ABSTRACT

A distance measuring apparatus includes a light receiving device having at least one array of photoelectric conversion elements, wherein each of the photoelectric conversion elements converts light received thereon into an electric charge and accumulates the electric charge so that each the accumulated electric charge is output in order from each photoelectric conversion element as an electrical picture signal of the light receiving device; an A/D converter which converts the picture signal into digital image data; a converting device which performs a logarithmic transformation on the digital image data to replace the digital image data with sensor data; and an operation device which performs a distance measuring calculation in accordance with the sensor data.

22 Claims, 13 Drawing Sheets

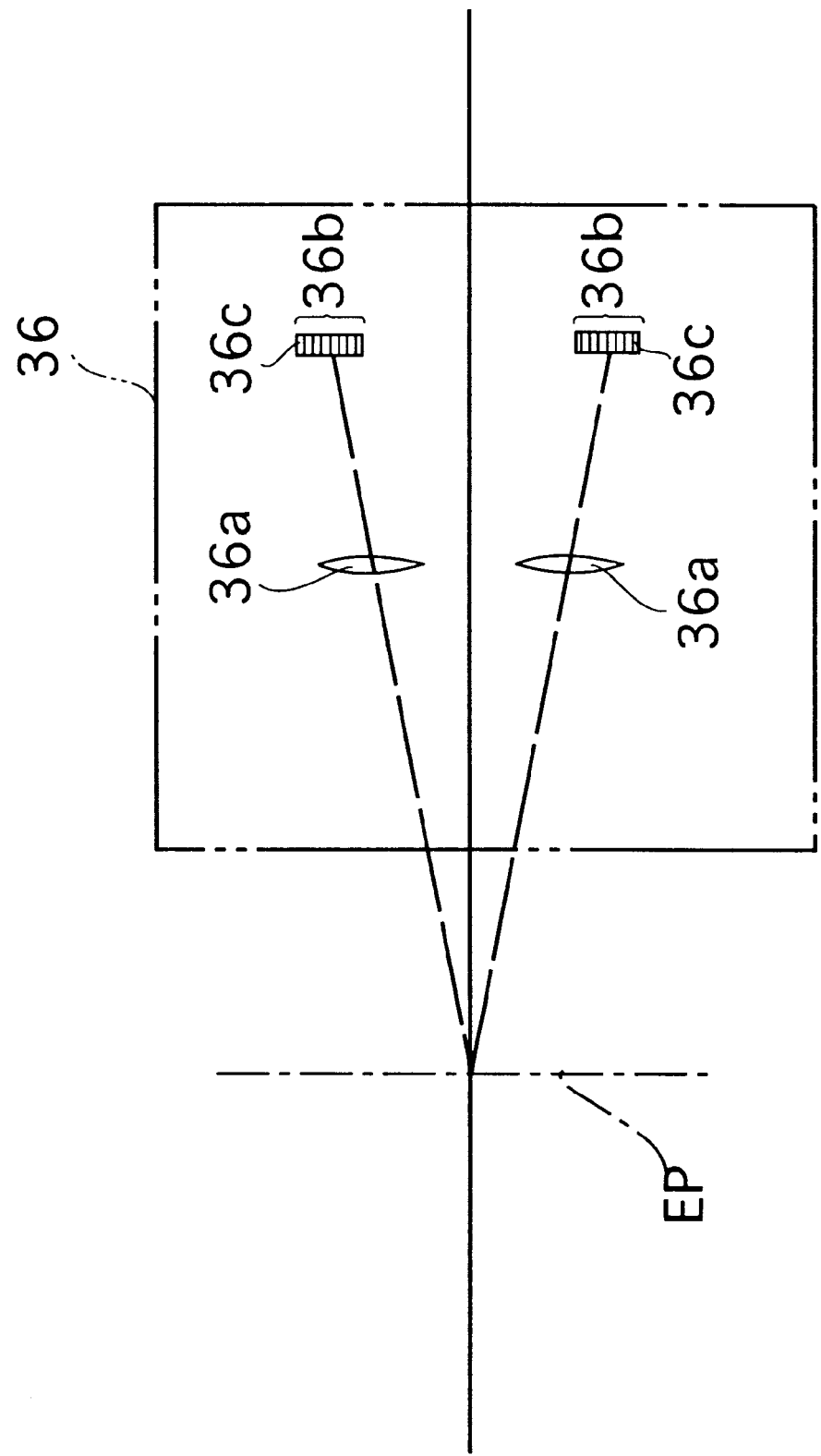

4EV Logarithmic Transformation

2EV Logarithmic Transformation

DISTANCE MEASURING APPARATUS

BACKGROUND OF THE INVENTION

1. Field of the Invention

The present invention relates to a passive-type distance measuring apparatus that is provided with a distance measuring sensor which converts the incident light into an analogue signal.

2. Description of the Related Art

A conventional passive-type distance measuring apparatus, which is widely used as a passive-type AF system for AF cameras, divides the image seen through a predetermined distance measuring zone (e.g., a focus detection zone in the case of an AF camera) into two images by a pair of separator optical systems to be respectively formed as two separate images (right and left images) on a corresponding pair of line sensors (right and left sensors). Each line sensor includes an array of photodiodes (an array of photoelectric conversion elements). Each photodiode converts the received light into an electric charge and accumulates (integrates) the electric charge. Then the accumulated electric charges are read out of the photodiodes in order at every photodiode as a picture signal (voltage). In accordance with the picture signals output from the pair of line sensors, a predetermined distance measuring operation is performed to obtain data such as the amount of defocus or the object distance that is necessary for bringing the object into focus. However, if this passive-type distance measuring apparatus uses a distance measuring sensor which converts the incident light into an analogue picture signal, the accuracy of measurement deteriorates and thus a proper calculated distance value or amount of defocus cannot be obtained by a distance measuring calculation by merely converting an analogue picture signal output from the distance measuring sensor into a digital signal, so as to use the digital signal in a predetermined distance measuring calculation, if the brightness and/or the contrast of an object is low because, e.g., the resolving power of a low brightness portion of the digital signal is low.

SUMMARY OF THE INVENTION

The primary object of the present invention is to provide a distance measuring apparatus which makes it possible to improve the accuracy of measurement.

To achieve the object mentioned above, according to an aspect of the present invention, a distance measuring apparatus is provided, including a light receiving device having at least one array of photoelectric conversion elements, wherein each of the photoelectric conversion elements converts light received thereon into an electric charge and accumulates the electric charge so that each accumulated electric charge is output in order from each photoelectric conversion element as an electrical picture signal of the light receiving device; an A/D converter which converts the picture signal into digital image data; a converting device which performs a logarithmic transformation on the digital image data to replace the digital image data with sensor data; and an operation device which performs a distance measuring calculation in accordance with the sensor data.

In an embodiment, the distance measuring apparatus further includes a determining device which determines whether a calculated distance value obtained by the distance measuring calculation is effective, whether a contrast in a portion of the sensor data is equal to or higher than a predetermined contrast value and whether an object brightness is equal to or greater than a predetermined object brightness, in accordance with the sensor data; and a prohibiting device which prohibits the converting device from performing the logarithmic transformation for the digital image data. If the determining device determines that the calculated distance value is not effective, that the contrast in the portion of the sensor data is lower than the predetermined contrast and that the object brightness is equal to or greater than the predetermined object brightness, the prohibiting device prohibits the converting device from performing the logarithmic transformation for the digital image data, so that a second picture signal that is output from the light receiving device is converted into second digital image data without performing the logarithmic transformation for the digital image data, wherein each of the photoelectric conversion elements accumulates the electric charge again so as to output the second picture signal, and the operation device performs the distance measuring calculation again in accordance with the second picture signal.

Preferably, the distance measuring apparatus further includes a memory in which each of the sensor data is stored.

The A/D converter inputs each picture signal in series, to subsequently convert a current picture signal of each picture signal into first digital image data, wherein the converting device subsequently inputs the first digital image data to perform a logarithmic transformation on the first digital data to convert the first image data into sensor data while the A/D converter converts a subsequent picture signal of the picture signals into second digital image data.

When the A/D converter converts the picture signals into second digital image data, the converting device can simultaneously input the first digital image data and perform a logarithmic transformation on the first digital data.

After the A/D converter has finished converting all of the picture signals, the converting device performs a logarithmic transformation on the second digital image data corresponding to the final picture signal.

Preferably, the light receiving device is a passive AF sensor.

Preferably, the distance measuring apparatus is incorporated in an AF camera.

According to another aspect of the present invention, a distance measuring apparatus is provided, including a light receiving device having at least one array of photoelectric conversion elements, wherein each of the photoelectric conversion elements converts light received thereon into an electric charge and accumulates the electric charge so that each accumulated electric charge is output in order from each photoelectric conversion element as an electrical picture signal of the light receiving device; an A/D converter which converts the picture signal into digital image data; a converting device which performs more than one logarithmic transformation for the digital image data in different conversion ranges to replace the digital image data with corresponding more than one sensor data of different conversion ranges; and an operation device which performs a distance measuring calculation in accordance with at least one of the sensor data of different conversion ranges. If an effective calculated distance value cannot be obtained by the distance measuring calculation using a first one of the more than one sensor data of different conversion ranges, the operation device performs the distance measuring calculation again using another one of the more than one sensor data of different conversion ranges. A conversion range in which one of the more than one logarithmic transformation is performed for the first one of the more than one sensor data is different from a conversion range in which another one of the more than one logarithmic transformation is performed for the another one of the more than one sensor data.

The distance measuring apparatus can further include a determining device which determines whether an object brightness is equal to or greater than a predetermined object brightness from an integral time of the light receiving device. If the determining device determines that a calculated distance value obtained by the distance measuring calculation using the first one of the more than one sensor data is not effective and that the object brightness is equal to or greater than the predetermined value, the operation device performs the distance measuring calculation again using a second one of the more than one sensor data. A conversion range in which a second one of the more than one logarithmic transformation is performed for the second one of the more than one sensor data is narrower than a conversion range in which a first one of the more than one logarithmic transformation is performed for the first one of the more than one sensor data.

In an embodiment, the converting device converts the picture signal into the digital image data and performs only the first one of the more than one logarithmic transformation for the digital image data if the object brightness is equal to or greater than the predetermined value at the time the light receiving element converts the picture signal into the digital image data.

In an embodiment, the converting device performs the more than one logarithmic transformation for the digital image data in different conversion ranges in a predetermined range in which the voltage of one of the digital image data which has the highest object brightness among the digital image data is determined as a reference value.

In an embodiment, the A/D converter inputs each picture signal in series, to subsequently convert a current picture signal of each picture signal into first digital image data, wherein the converting device subsequently inputs the first digital image data to perform a logarithmic transformation on the first digital data to convert the first image data into sensor data while the A/D converter converts a subsequent picture signal of each picture signal into second digital image data.

When the A/D converter converts the picture signals into second digital image data, the converting device can simultaneously input the first digital image data and perform a logarithmic transformation on the first digital data.

After the A/D converter has finished converting all of the picture signals, the converting device performs a logarithmic transformation on the second digital image data corresponding to the final picture signal Preferably, the light receiving device is a passive AF sensor.

Preferably, the distance measuring apparatus is incorporated in an AF camera.

According to another aspect of the present invention, an AF camera is provided, including a passive AF sensor having at least one array of photoelectric conversion elements, wherein each of the photoelectric conversion elements converts light received thereon into an electric charge and accumulates the electric charge so that the accumulated electric charges are output from each photoelectric conversion element as an electrical picture signal of the passive AF sensor; a converting device which converts the picture signal into digital image data and performs a logarithmic transformation for the digital image data to replace the digital image data with sensor data; and an operation device which calculates an amount of defocus in accordance with the sensor data.

The present disclosure relates to subject matter contained in Japanese Patent Applications Nos.11-236996 and 11-236997 (both filed on Aug. 24, 1999) which are expressly incorporated herein by reference in their entireties.

BRIEF DESCRIPTION OF THE DRAWINGS

The present invention will be described below in detail with reference to the accompanying drawings in which:

FIG. 5 is a schematic diagram of a phase-difference distance measuring sensor provided in the lens-shutter type camera shown in FIG. 1;

DESCRIPTION OF THE PREFERRED EMBODIMENTS

Figure 1:
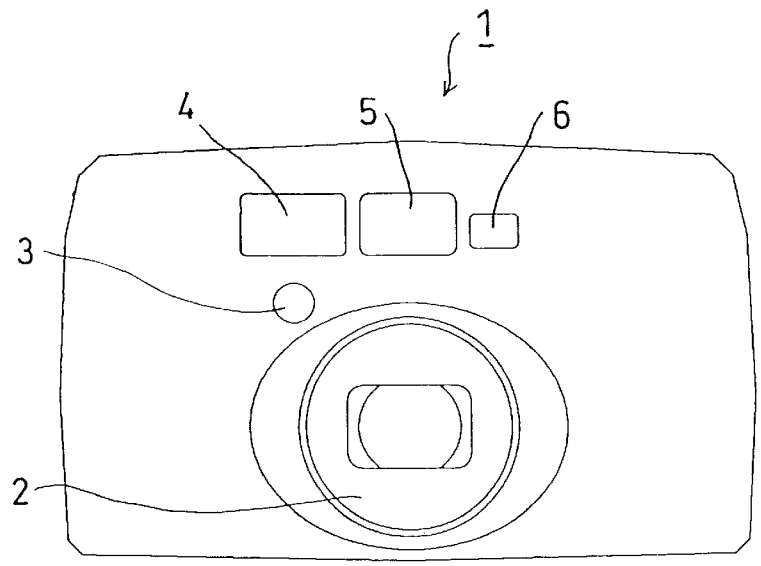
FIG. 1 is a front view of an embodiment of a lens-shutter type camera having a distance measuring device according to the present invention.
Figure 2:
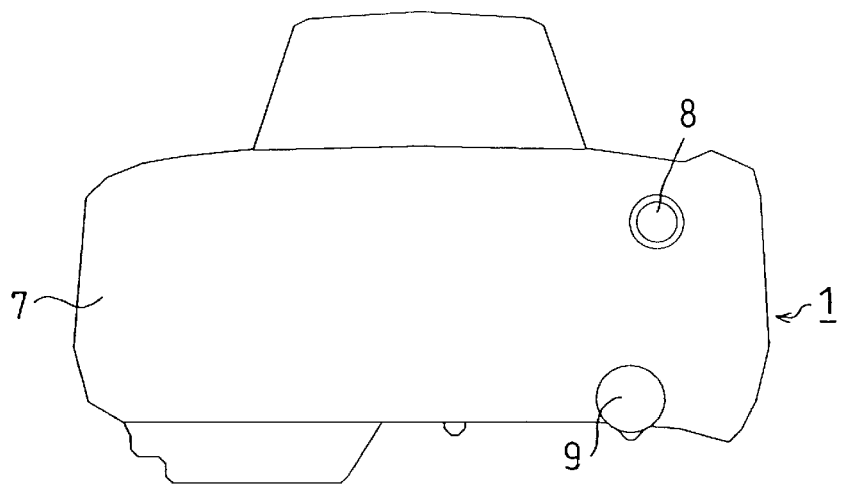
FIG. 2 is a plan view of the lens-shutter type camera shown in FIG. 1.
Figure 3:
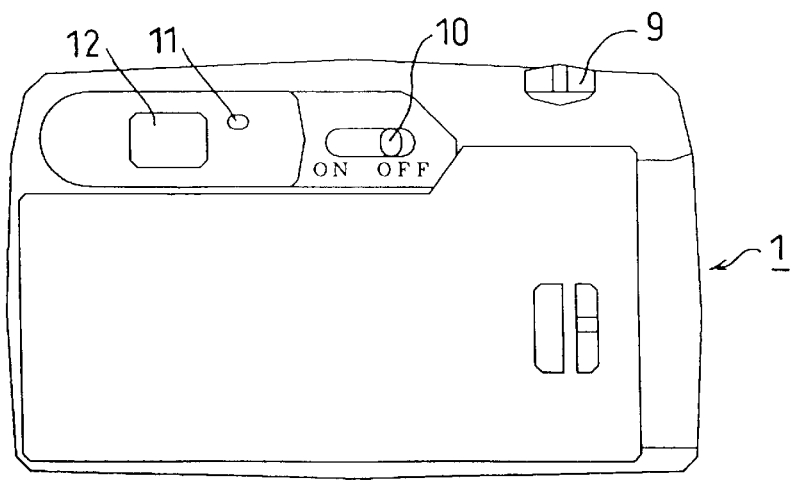
FIG. 3 is a rear view of the lens-shutter type camera shown in FIG. 1.

FIGS. 1 through 3 show an embodiment of a lens-shutter AF camera according to the present invention. A camera 1 is provided on the front thereof with a zoom lens 2. The camera 1 is provided on the front thereof above the zoom lens 2 with an auxiliary AF light projecting window 3, a passive AF light receiving window 4, a viewfinder window 5 and a photometering window 6. The camera 1 is provided therein behind the auxiliary AF light projecting window 3, the passive AF light receiving window 4, the viewfinder window 5, and the photometering window 6 with an auxiliary AF light emitter (not shown), a distance measuring sensor (passive AF sensor) 36 (See FIG. 5), a viewfinder optical system (not shown) and a photometering sensor (not shown), respectively.

The camera 1 is provided on a top panel 7 thereof with a release button 8. The release button 8 is interconnected with a photometering switch SWS and a release switch SWR (see FIG. 4) so that the photometering switch SWS and the release switch SWR are turned ON if the release button 8 is depressed by a half step and a full step, respectively.

The camera 1 is provided at a rear upper center position thereof with a main switch knob 10 that is interconnected with a main switch (power switch) SWM (see FIG. 4) so that the main switch SWM is turned ON and OFF if the main switch knob 10 is moved left and right as viewed in FIG. 3, respectively. The camera 1 is provided at a rear upper right position thereof with a zooming knob 9 which is manually operated to drive the zoom lens 2 in a telephoto direction or a wide-angle direction. The zooming knob 9 is interconnected with a telephoto switch SWT and a wide-angle switch SWW (see FIG. 4) so that the telephoto switch SWT and the wide-angle switch SWW are turned ON if the zooming knob 9 is moved to a telephoto side (e.g., the right side as viewed in FIG. 3) and a wide-angle side (e.g., the left side as viewed in FIG. 3), respectively. Each of the telephoto switch SWT and the wide-angle switch SWW is turned OFF when the zooming knob 9 is in a neutral position shown in FIGS. 2 and 3. The camera 1 is provided at a rear upper left position thereof with an eyepiece window 12. The camera 1 is provided, on the rear thereof in the vicinity of the eyepiece window 12, with a green light emitter (e.g., a green LED) 11. The green light emitter 11 is controlled to light up or flash ON and OFF (blink) depending on the result of distance measurement so as to inform the user of the same.

Figure 4:
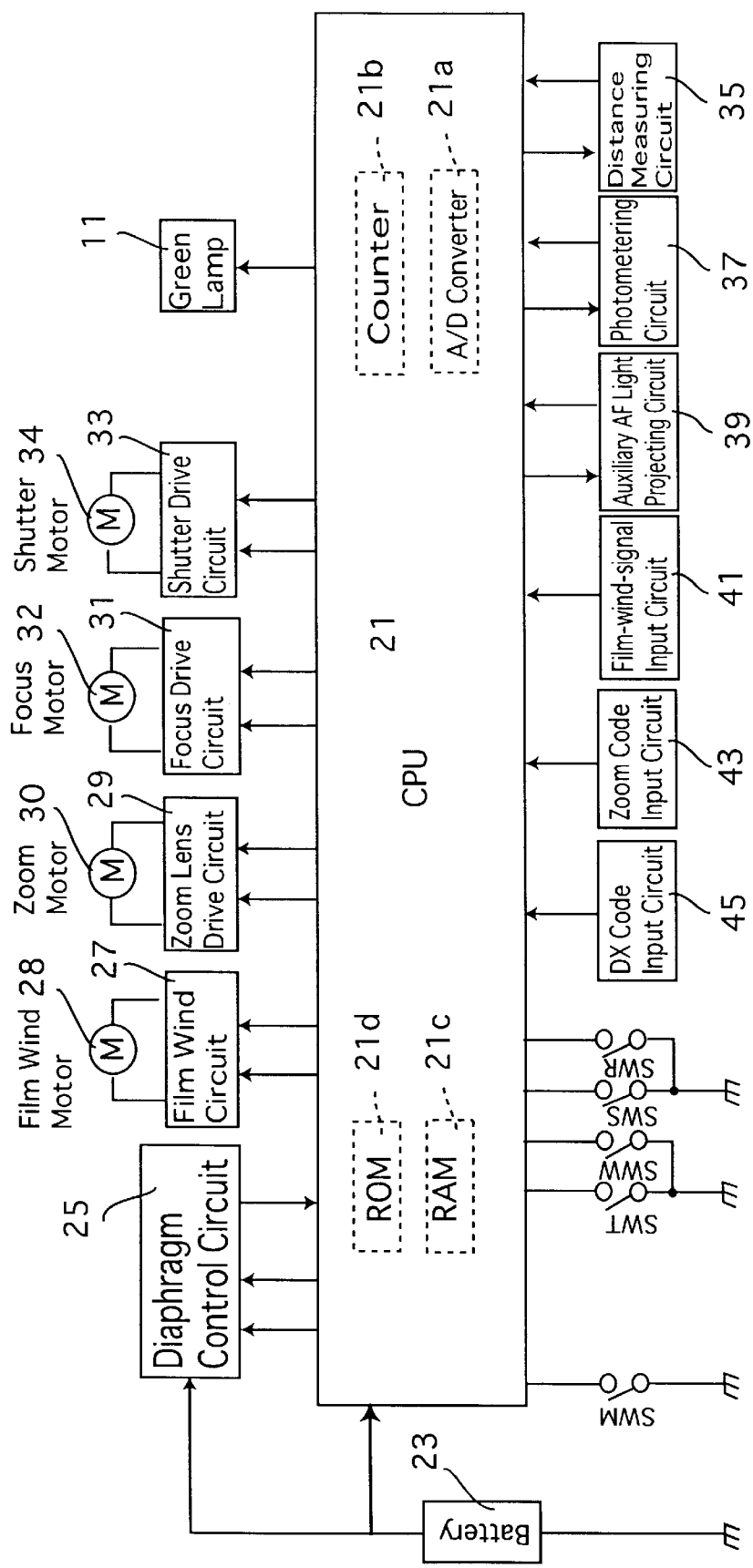
FIG. 4 is a block diagram of fundamental elements of a control system provided in the lens-shutter type camera shown in FIG. 1.

Fundamental elements of a control system of the camera 1 will be hereinafter discussed in detail with reference to FIG. 4. The control system includes the green light emitter 11, a CPU (converting device/operation device/determining device/prohibiting device) 21, a battery 23, a diaphragm control circuit 25, a film wind circuit 27, a zoom lens drive circuit 29, a focus drive circuit 31, a shutter drive circuit 33, a distance measuring circuit 35, a photometering circuit 37 and an auxiliary AF light projecting circuit 39. The control system further includes a film-wind-signal input circuit 41, a zoom code input circuit 43, a DX code input circuit 45, the photometering switch SWS, the release switch SWR, the telephoto switch SWT, the wide-angle switch SWW and the main switch SWM. The control system further includes a film wind motor 28, a zoom motor 30, a focus motor 32 and a shutter motor 34 which are connected to the film wind circuit 27, the zoom lens drive circuit 29, the focus drive circuit 31 and the shutter drive circuit 33, respectively. The CPU 21 is provided therein with an A/D converter 21a, a counter 21b, a RAM 21c and a ROM 21d. Various parameters for determining control or calculation are temporarily stored in the RAM 21c, while programs for various functions of the camera 1 are written in the ROM 21d. The CPU 21 comprehensively controls the overall operations of the camera body 1.

The main switch SWM (which is interconnected with the main switch knob 10), the telephoto switch SWT (which is interconnected with the zooming knob 9), the wide-angle switch SWW (which is also interconnected with the zooming knob 9), the photometering switch SWS (which is interconnected with the release button 8) and the release switch SWR (which is also interconnected with the release button 8), are electrically connected to the CPU 21.

Upon the main switch SWM being turned ON, the CPU 21 starts supplying power from the battery 23 to peripheral circuits which are connected to input/output ports of the CPU 21 to perform operations corresponding to operations of the switches.

Upon the telephoto switch SWT being turned ON, the CPU 21 starts driving the zoom motor 30 via the zoom lens drive circuit 29 to move the zoom lens 2 in a telephoto direction. Likewise, upon the wide-angle switch SWW being turned ON, the CPU 21 starts driving the zoom motor 30 via the zoom lens drive circuit 29 to move the zoom lens 2 in a wide-angle direction. The focal length of the zoom lens 2 and the axial position of the same are detected by the zoom code input circuit 43. Upon the main switch SWM being turned ON, the CPU 21 controls the zoom motor 30 to keep rotating forwardly until the zoom lens 2 advances to the wide-angle extremity thereof. Upon the main switch SWM being turned OFF, the CPU 21 controls the zoom motor 30 to keep rotating reversely until the zoom lens 2 retracts into the retracted position thereof, at which the zoom lens 2 is fully retracted in the camera body.

The CPU 21 calculates the subject brightness via the photometering circuit 37 upon the photometering switch SWS being turned ON. The photometering circuit 37 is provided with a photometering sensor (not shown) for receiving light from the object through the photometering window 6. The photometering circuit 37 outputs a photometric signal which corresponds to the object brightness to the CPU 21.

Thereafter, the CPU 21 performs an AE calculation process in accordance with the calculated object brightness, ISO film speed input via the DX code input circuit 45 to calculate the optimum shutter speed and the optimum aperture value. The DX code input circuit 45 reads DX code printed on a film cartridge (not shown) loaded in the camera body 1 to output the ISO film speed, the number of exposures, and other information on the loaded film to the CPU 21.

The CPU 21 performs a predetermined image processing operation for processing an analogue picture signal input from the distance measuring circuit 35, and subsequently performs a distance measuring calculation in accordance with the processed picture signal (digital image data). If the calculated distance value (amount of defocus) obtained by the distance measuring calculation is effective, the CPU 21 calculates the amount of driving of the focus motor 32 (LL data) for driving a focusing lens group (not shown) of the zoom lens 2 to drive the focus motor 32 via the focus drive circuit 31, and at the same time, the CPU 21 turns ON the green light emitter 11. If the calculated distance value is not effective, the CPU 21 makes the green light emitter 11 to flash ON and OFF (blink) to inform the user that the distance measuring calculation ended in failure.

The distance measuring circuit 35 detects a focus state of the object image formed within a distance measuring zone (a focus detection zone) provided in a picture plane (not shown) of the camera 1. The distance measuring circuit 35 is provided with the distance measuring sensor (light receiving device) 36 which converts the received object light into an electrical picture signal (electric charges) and to output the picture signal. FIG. 5 shows the schematic structure of the distance measuring sensor 36. The distance measuring sensor 36, which is disposed behind the passive AF light receiving window 4, is provided with a pair of separator lenses 36a and a corresponding pair of line sensors 36b. In FIG. 5, "EP" represents a focal plane which is optically equivalent to a film plane (picture plane). The image observed through the distance measuring zone is divided into two by the pair of separator lenses to be formed as two separate images on the corresponding pair of line sensors 36b. Each line sensor 36b is provided with an array of photodiodes (photoelectric conversion elements) 36c. Each photodiode 36c of each line sensor 36b receives the split object light bundles, converts the light into an electric charge and accumulates (integrates) the electric charges. The electric charges obtained by the integration process at each photodiode 36c of each line sensor 36b are successively converted to a voltage for each pixel and is output as a picture signal for each pixel to the main CPU 21.

The distance measuring circuit 35 is provided with a monitor sensor (not shown) for monitoring the value of the integrated electric charges. The CPU 21 completes the integration process of the pair of line sensors 36b when the integral value of the monitor sensor reaches a predetermined value.

The auxiliary AF light projecting circuit 39 is controlled by the CPU 21 so that the auxiliary AF light emitter, that is positioned behind the auxiliary AF light projecting window 3, projects a contrast pattern onto an object if the brightness or the contrast of the object is low.

Upon the release switch SWR being turned ON, the CPU 21 controls the diaphragm control circuit 25 to stop down the diaphragm of the zoom lens 2 in accordance with the determined aperture value. At the same time, the CPU 21 actuates the shutter motor 34 to release the shutter via the shutter control circuit 33 in accordance with the determined shutter speed.

Upon completion of an exposure, the CPU 21 drives the film wind motor 28 to rotate forwardly via the film wind circuit 27 to wind the film by one frame while a film wind signal is input via the film-wind-signal input circuit 41. However, after the last frame of the film is exposed, the CPU 21 drives the film wind motor 28 to rotate reversely via the film wind circuit 27 to rewind the film.

In addition to the aforementioned fundamental elements, the camera 1 is further provided with various known devices such as a self-timer light indicator which indicates that the self timer is in operation, a flashlight emitter which emits flashlight under control of the CPU 21, and an LCD panel which indicates various photographic information.

Figure 6A:
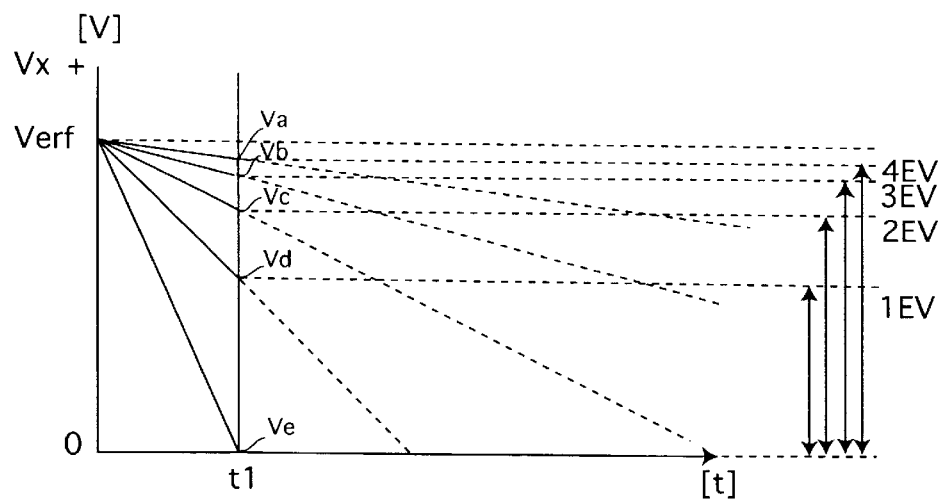
FIG. 6A is a graph showing the relationship between a picture signal (Vx) output from the phase-difference distance measuring sensor shown in FIG. 5 and time (t), by way of example.

FIG. 6A is a graph showing the relationship between a picture signal Vx (voltage: Va, Vb, Vc, Vd or Ve) output from the corresponding photodiode 36c (a, b, c, d or e) on each line sensor 36b of the distance measuring sensor 36, and time (t), by way of example. In FIG. 6A, "Vref" represents the reference voltage. As time elapses, the voltage of the picture signal Vx descends from the reference voltage Vref by the amount of charges integrated by each photodiode 36c. The CPU 21 controls each photodiode of each line sensor 36b to stop integrating charges at the time the voltage of the picture signal Vx (Va, Vb, Vc, Vd or Ve) output from either line sensor reaches zero volts (0V), or a predetermined maximum integration time elapses. Zero volts (0V) is herein determined as the integration completion value (voltage). As the object brightness becomes higher, the time necessary for the voltage of the picture signal Vx to reach the integration completion value becomes shorter. Accordingly, it can be understood from FIG. 6A that the inclination of the line showing the voltage of the picture signal Vx is in proportion to the object brightness, and the greater the absolute value of the inclination of the line showing the picture signal Vx, the higher the object brightness.

Figure 6B:
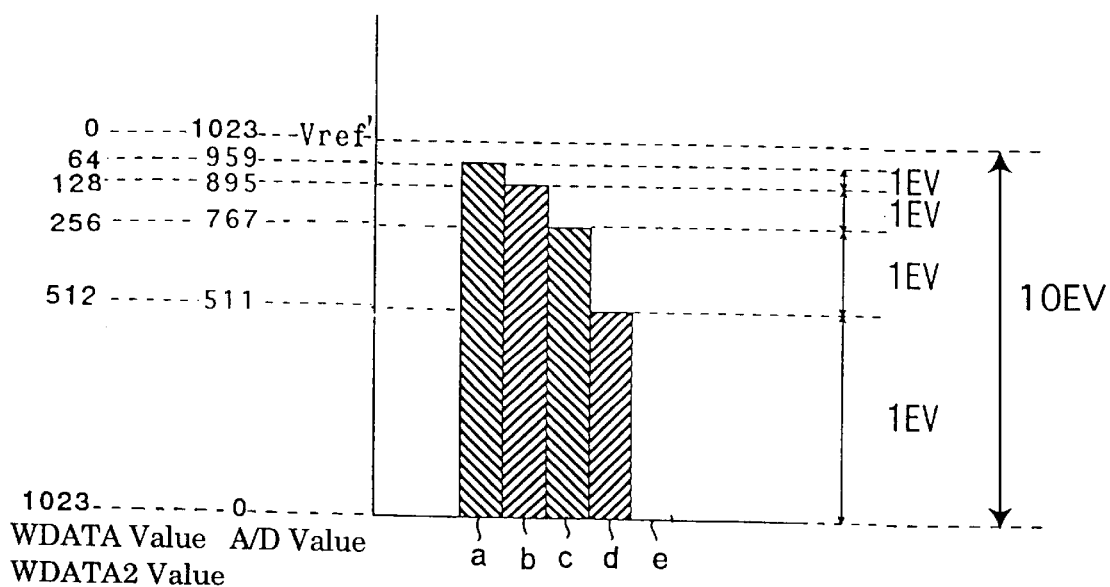
FIG. 6B is a graph showing digital image data, wherein analogue picture signals Va through Ve output from the phase-difference distance measuring sensor shown in FIG. 5 at the time "t1" are converted into the digital image data on the photodiodes "a" through "e" in the range of 0(V) to Vref, respectively.

In FIG. 6A, a picture signal Ve of the highest brightness is determined as a reference value (0EV), while EV values (0EV through 4EV in FIG. 6A) are determined as values which vary relative to the picture signal Ve, so that the greater the picture signal Vx, i.e., the lower the object brightness, the greater the EV value. In FIGS. 6A and 6B, five picture signals Va, Vb, Vc, Vd and Ve are indicated in increments of 1EV.

The integration completion time of the picture signal Ve, the integrating operation of which completes first in FIG. 6A, is determined as time t1, while digital image data on the photodiodes "a" through "e", which are respectively obtained by converting the picture signals Va through Ve into a 10-bit digital form at the time t1 in the range of 0(V) to Vref, are indicated in FIG. 6B. In FIG. 6B, the difference value $\Delta EV$ obtained by a formula "$\Delta EV = \log_2 (Vref - A/D \text{ value})$" indicates the difference of the brightness value between Vref and each digital image data. Note that the difference value $\Delta EV$ in the range of 0(V) to Vref corresponds to $\Delta$ 10EV. Table 1 shows the relationship between the difference value $\Delta EV$ and each digital image data (A/D value).

TABLE 1

| Photodiode | A/D value | Vref - A/D value | $\Delta EV$ |
| --- | --- | --- | --- |
| a | 959 | 64 | 6 |
| b | 895 | 128 | 7 |
| c | 767 | 256 | 8 |
| d | 511 | 512 | 9 |
| e | 0 | 1023 | 10 approx. |

Figure 6C:
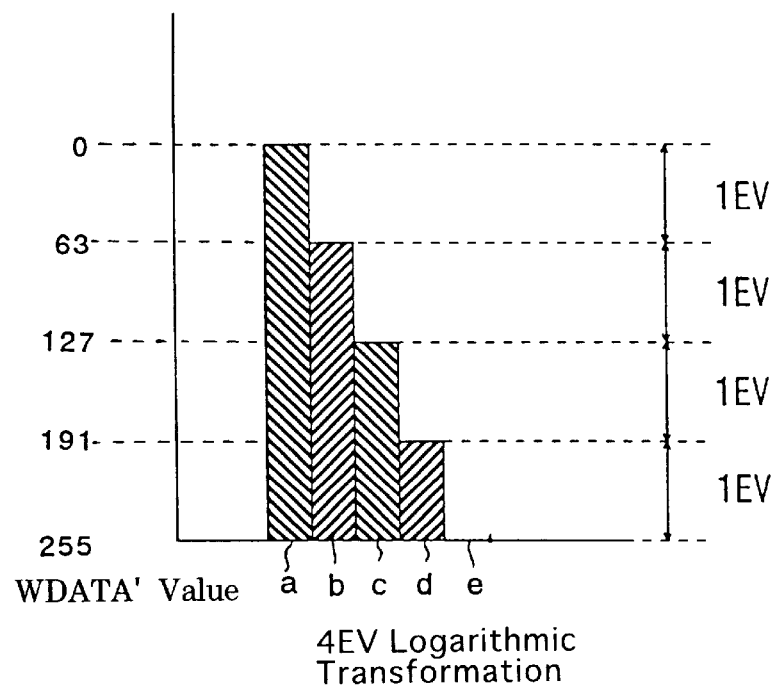
FIG. 6C a graph showing 4EV sensor data, wherein a logarithmic transformation is performed for each of the digital image data on the photodiodes "a" through "e" shown in FIG. 6B to obtain corresponding 4EV sensor data.
Figure 6D:
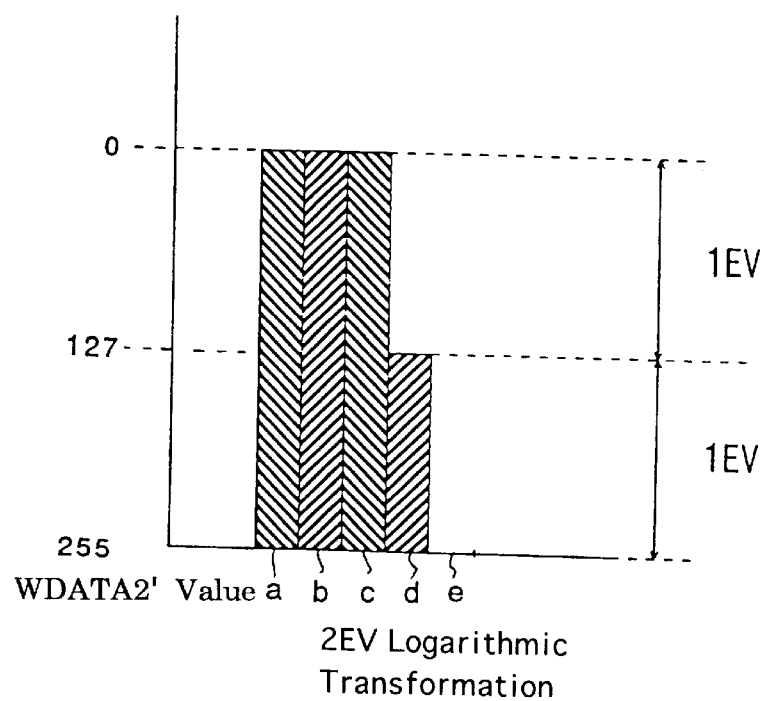
FIG. 6D is a graph showing 2EV sensor data, wherein another logarithmic transformation is performed for each of the digital image data on the photodiodes "a" through "e" shown in FIG. 6B to obtain corresponding 2EV sensor data.

FIG. 6C is a bar graph showing sensor data (4EV sensor data), wherein a logarithmic transformation (hereinafter referred to as "4EV logarithmic transformation") is performed for each of the digital image data on the photodiodes "a" through "e" to obtain the 4EV sensor data by converting each of the digital image data on the photodiodes "a" through "e" into a corresponding 8-bit data (0 through 255 steps) while dividing 1EV into 64 steps. FIG. 6D is a bar graph showing sensor data (2EV sensor data), wherein a logarithmic transformation (hereinafter referred to as "2EV logarithmic transformation") is performed for each of the digital image data on the photodiodes (36c) "a" through "e" to obtain the 2EV sensor data by converting each of the digital image data on the photodiodes (36c) "a" through "e" into a corresponding 8-bit data (0 through 255 steps) while dividing 1EV into 128 steps.

In each of FIGS. 6B, 6C and 6D, the vertical axis represents the digital image data (A/D value) or the logarithmic transformation value (WDATA value) thereof, while the horizontal axis represents the reference designators ("a", "b", "c", "d" and "e") of the photodiodes 36c on each line sensor 36b of the distance measuring sensor 36. In each of FIGS. 6B, 6C and 6D, the bar is shorter as the object brightness is higher. However, although a bar which represents the digital image data on the photodiode "e" cannot be illustrated in the bar graph in each of FIGS. 6B, 6C and 6D because the picture signal Ve, the integrating operation of which completes first, is determined as the reference value , the object brightness of the digital image data on the photodiode "e" is the highest. In FIG. 6C, the logarithmic transformation is performed for the digital image data whose difference of brightness value from the reference value (the picture signal Ve) is less than or equal to 4EV. In FIG. 6D, the logarithmic transformation is performed for the digital image data whose difference of brightness value from the reference value (the picture signal Ve) is less than or equal to 2EV.

If the main CPU 21 calculates the distance value based on the digital image data shown in FIG. 6B, which are obtained by converting the picture signal Vx into a 10-bit digital form, the calculated distance value may not be an appropriate value if a desired object image to be photographed is positioned in a low-brightness portion of the digital image data since the resolving power in a low-brightness portion is low. However, in order to increase the resolving power in the low-brightness portion, if a logarithmic transformation is performed for each of the digital image data on the photodiodes (36c) "a" through "e" shown in FIG. 6B to use the logarithmic-transformed data in the distance measuring calculation, it is sometimes the case that the resolving power in a high-brightness portion of the image data decreases excessively.

In order to prevent such a problem from occurring, in the distance measuring process performed in the first embodiment of the photographing process, firstly, each photodiode 36c of the distance measuring sensor 36 is controlled to accumulate (integrates) electric charges and output the same as picture signals, and then the picture signals are converted into corresponding digital image data. Subsequently, the aforementioned 4EV logarithmic transformation is performed for each of the digital image data to obtain the 4EV sensor data as shown in FIG. 6c. Subsequently, the distance measuring calculation is performed using the 4EV sensor data. In this calculation, an appropriate calculated distance value can be obtained even if a desired object image to be photographed is positioned in a low-brightness portion of the digital image data since the distance measuring calculation is performed with the resolving power in the low-brightness portion having been enhanced.

However, if the CPU 21 determines that an appropriate calculated distance value cannot be obtained by the distance measuring calculation using the 4EV sensor data and that there is only a little difference in data in a high-brightness portion of the 4EV sensor data (i.e., there is only a little difference in image contrast in a high-brightness portion of the 4EV sensor data), each photodiode 36c of the distance measuring sensor 36 is again controlled to accumulate (integrate) electric charges and output the same as picture signals, and then the picture signals are converted into corresponding digital image data. Subsequently, the distance measuring calculation is performed using the digital image data, rather than the 4EV sensor data; namely, the 4EV logarithmic transformation for each of the digital image data is not performed. According to this distance measuring calculation using the digital image data, although the resolving power in a low-brightness portion of the digital image data decreases, the resolving power in a high-brightness portion of the digital image data can be made high. Therefore, an appropriate calculated distance value can be obtained by the distance measuring calculation even if a desired object image to be photographed is positioned in a high-brightness portion of the digital image data. The digital image data and the 4EV sensor data are stored in the RAM 21c.

Figure 7:
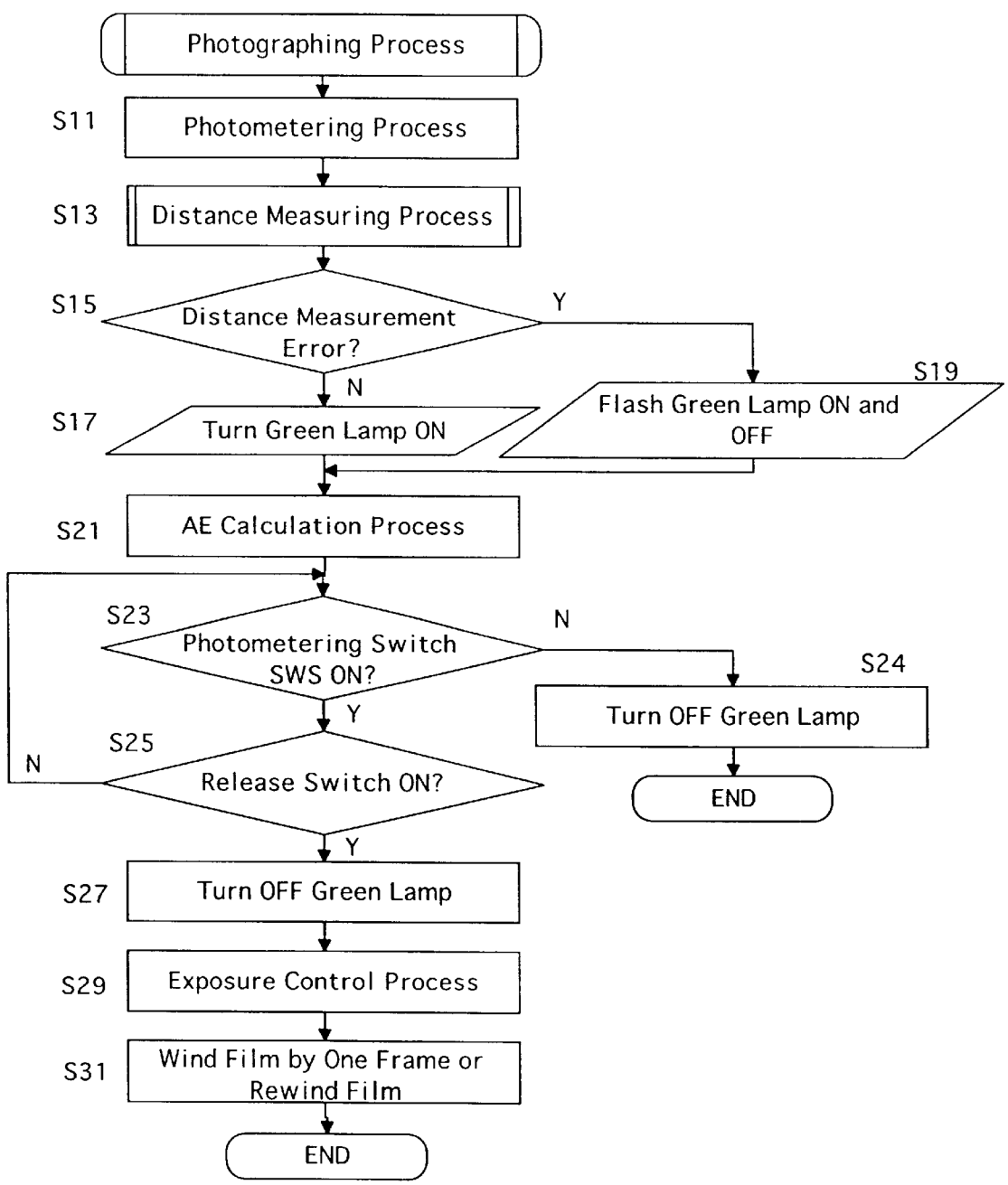
FIG. 7 a flow chart showing the first embodiment of the photographing process of the lens-shutter type camera shown in FIG. 1.

The operation of the camera 1 will be hereinafter discussed with reference to flow charts shown in FIGS. 7 through 10. FIG. 7 is a flow chart showing the first embodiment of the photographing process of the camera 1. This operation is performed upon the photometering switch SWS being turned ON.

In the photographing process, firstly, a photometering process is performed to calculate the object brightness (brightness value Bv) in the distance measuring zone (step S11). Subsequently, a distance measuring process ("Distance Measuring Process" described in FIG. 8) is performed to calculate a distance value (step S13). In the distance measuring process at step S13, the picture signals output from each line sensor 36b of the distance measuring sensor 36 is input and processed to obtain corresponding digital image data, and subsequently the aforementioned distance measuring calculation is performed using the digital image data to thereby obtain a calculated distance value. Thereafter it is determined whether the calculated distance value is effective. If the calculated distance value is effective, the CPU 21 drives the focus motor 32 via the focus drive circuit 31 in accordance with the calculated distance value.

After the distance measuring process is performed at step S13, it is determined whether a distance measurement error flag is 1 (step S15). If the distance measurement error flag is set to 1 (i.e., if an appropriate calculated distance value cannot be obtained in the distance measuring process), control proceeds to step S19 at which the green light emitter 11 is controlled to flash ON and OFF (blink) so as to warn the user. If the distance measurement error flag is set to 0, control proceeds to step S17 at which the green light emitter 11 is controlled to light up. Subsequently, an AE calculation process is performed (step S21). In the AE calculation process, the optimum shutter speed and the optimum aperture value are calculated in accordance with the object brightness, ISO film speed input via the DX code input circuit 45 and other factors.

Subsequently, it is determined whether the photometering switch SWS is ON (step S23). If the photometering switch SWS is not ON, the green light emitter 11 is turned OFF (step S24), and then control ends. If the photometering switch SWS is ON, it is determined whether the release switch is ON (step S25). If it is determined at step S25 that the release switch is not ON, control returns to step S23 to wait for either the photometering switch SWS or the release switch SWS to be turned ON. Upon the release switch SWR being turned ON, the green light emitter 11 is turned OFF (step S27). Subsequently, an exposure control process in which the diaphragm control circuit 25 is controlled to stop down the diaphragm of the zoom lens 2 in accordance with the calculated exposure value is performed (step S29).

Thereafter, the film wind motor 28 is driven to rotate in a forward direction via the film wind circuit 27 to wind the film by one frame (step S31). However, after the last frame of the film is exposed, the film wind motor 28 is driven to rotate in a reverse direction via the film wind circuit 27 to rewind the film. Thereafter control ends.

Figure 8A:
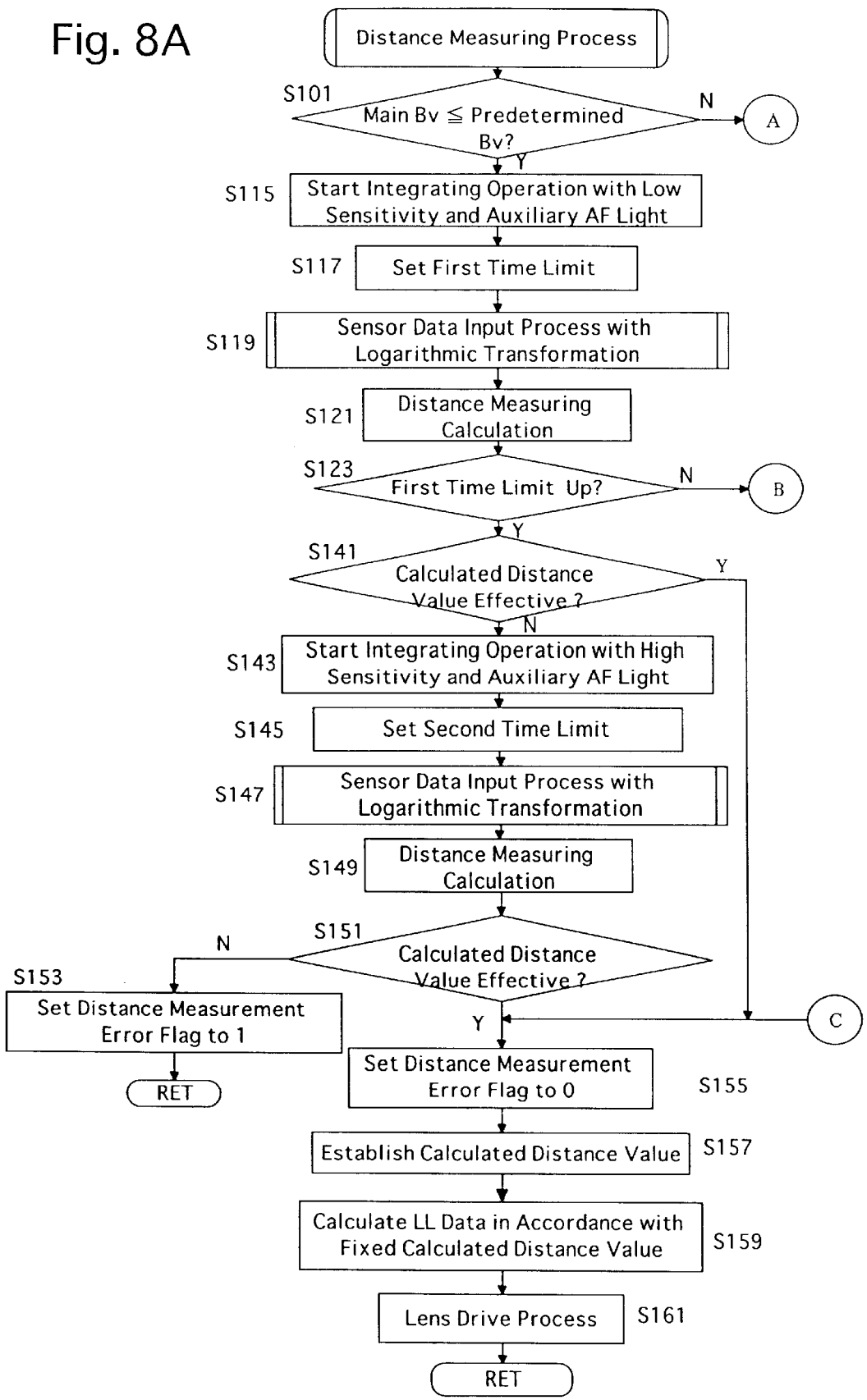
FIGS. 8A and 8B are flow charts showing the distance measuring process performed in the first embodiment of the photographing process shown in FIG. 7.
Figure 8B:
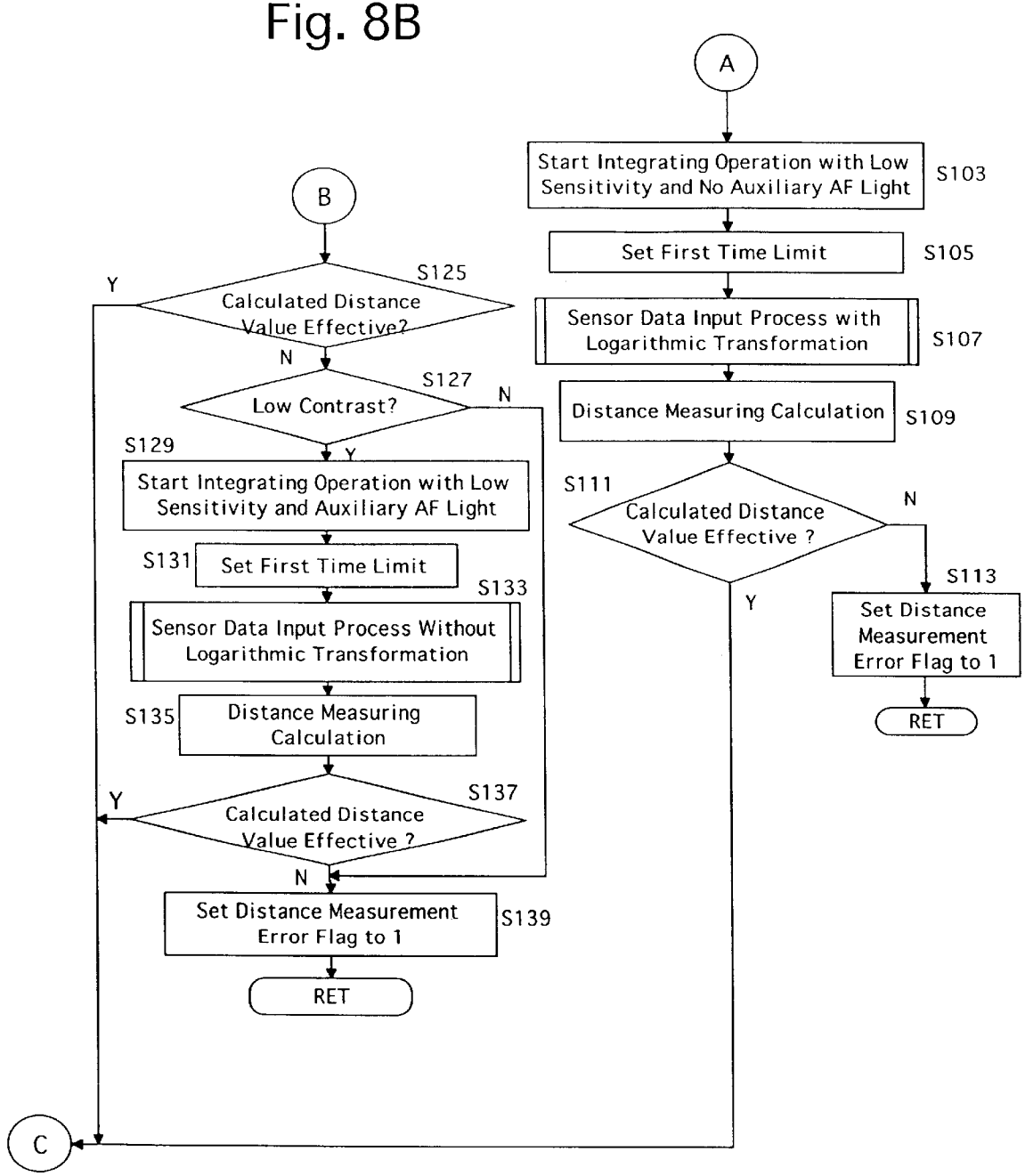

The distance measuring process performed at step S13 in FIG. 7, will be hereinafter discussed in detail with reference to FIGS. 8A and 8B. In the distance measuring process performed in the first embodiment of the photographing process shown in FIG. 7, firstly, it is determined whether the calculated brightness value Bv calculated in the photometering process at step S11 is equal to or smaller than a predetermined brightness value (step S101).

Process in the case of the calculated brightness value Bv being greater than the predetermined brightness value will be hereinafter discussed first. If it is determined at step S101 that the calculated brightness value Bv is not equal to or smaller than the predetermined brightness value, the sensitivity of the distance measuring sensor 36 is set at a low sensitivity, and then the integrating operation in which each photodiode 36c of the distance measuring sensor 36 accumulates (integrates) electric charges is started (step S103). Subsequently, a first time-up limit is set (step S105). The first time-up limit corresponds to the aforementioned maximum integration time of the distance measuring sensor 36. The CPU 21 controls each line sensor 36b to stop integrating charges at the time one of the picture signals reaches the integration completion value (voltage), or the predetermined maximum integration time elapses, and thereafter a sensor data input process ("Sensor Data Input Process" shown in FIG. 9) is performed (step S107). In the sensor data input process, the picture signals output from the distance measuring sensor 36 are input to convert each of the input picture signals into a 10-bit digital form (the digital image data), and subsequently the 4EV logarithmic transformation is performed for each of the digital image data to obtain the 4EV sensor data.

After the sensor data input process at step S107, the distance measuring calculation is performed using the 4EV sensor data (step S109). Subsequently, it is determined whether the calculated distance value obtained by the distance measuring calculation is effective (step S111). In the distance measuring process performed in the first embodiment of the photographing process, it is determined by the CPU 21 that the calculated distance value is effective if the calculated distance value satisfies a predetermined condition, more specifically, if the reliability thereof is equal to or greater than a predetermined reliability.

If it is determined at step S111 that the calculated distance value is not effective, the distance measurement error flag is set to 1 (step S113), and then control returns to the photographing process shown in FIG. 7. If it is determined at step S111 that the calculated distance value is effective, control proceeds to step S155 at which the distance measurement error flag is set to 0. Subsequently, the effective calculated value is established (step S157). Thereafter, an LL data (i.e., the number of pulses for driving the focus motor 30) is calculated in accordance with the established calculated distance value (step S159). Subsequently, a lens drive process is performed in which the focus motor 30 is driven to move the focusing lens group of the zoom lens 2 to an in-focus position thereof in accordance with the calculated LL data (step S161). Thereafter control returns to the photographing process shown in FIG. 7.

The process in the case of the calculated brightness value Bv being greater than the predetermined brightness value has been discussed above; however, another process for the case where the calculated brightness value Bv is equal to or smaller than the predetermined brightness value will be hereinafter discussed.

If it is determined at step S101 that the calculated brightness value Bv is equal to or smaller than the predetermined brightness value, the sensitivity of the distance measuring sensor 36 is set to a low sensitivity, the auxiliary AF light projecting circuit 39 starts operating, and the integrating operation, in which each photodiode 36c of the distance measuring sensor 36 accumulates (integrates) electric charges, is started while the auxiliary AF light emitter projects a contrast pattern onto the object (step S115). Subsequently, the first time limit is set (step S117). Subsequently, the sensor data input process ("Sensor Data Input Process" shown in FIG. 9) is performed to obtain the 4EV sensor data (step S119). Thereafter, the distance measuring calculation is performed using the 4EV sensor data (step S121). Subsequently, it is determined whether the first time-up limit is up, i.e., whether the predetermined maximum integration time has elapsed (step S123).

If it is determined at step S123 that the first time limit has not elapsed yet, namely, the object brightness (distance measuring area) is high, it is determined whether the calculated distance value obtained by the distance measuring calculation is effective (step S125). If it is determined at step S125 that the calculated distance value is effective, control proceeds to step S155. If it is determined at step S123 that the first time limit has not elapsed yet, and subsequently, if it is determined at step S125 that the calculated distance value is not effective, it is determined whether there is any image contrast in accordance with the differences among the 4EV sensor data (step S127). Specifically, the CPU 21 calculates a difference in data for each pair of adjacent pixels of the 4EV sensor data and then determines that there is an image contrast if the sum of the absolute values of the total differences is equal to or greater than a predetermined contrast value. If it is determined at step S127 that there is an image contrast, it is considered that the distance measuring calculation was not normally performed for some reason, so that control proceeds to step S139 at which the distance measurement error flag is set to 1, and subsequently control returns to the photographing process shown in FIG. 7.

If it is determined at step S127 that there is no image contrast, it is considered that the resolving power in a high-brightness portion of the image data has decreased due to the sensor data input process performed at step S119, and thus, an effective calculated distance value could not be obtained. Accordingly, the integrating operation is again performed, similar to step S115. More specifically, the sensitivity of the distance measuring sensor 36 is set at a low sensitivity, the auxiliary AF light projecting circuit 39 starts operating, and the integrating operation in which the distance measuring sensor 36 accumulates (integrates) electric charges is started, while the auxiliary AF light emitter projects a contrast pattern onto the object (step S129). Subsequently, the first time limit is set (step S131). Subsequently, the sensor data input process ("Sensor Data Input Process" shown in FIG. 9) is performed (step S133). At this time, in the sensor data input process, the picture signals output from the distance measuring sensor 36 are input to convert each of the input picture signals into a 10-bit digital form (the digital image data), however, the 4EV logarithmic transformation is not performed for each of the digital image data. Thereafter, the distance measuring calculation is performed again using the digital image data, of which the resolving power of a low-brightness portion is high (step S135). Subsequently, it is determined whether the calculated distance value obtained by the distance measuring calculation is effective (step S137). If it is determined at step S137 that the calculated distance value is effective, control proceeds to step S155. If it is determined at step S137 that the calculated distance value is not effective, the distance measurement error flag is set at 1 (step S139), and then control returns to the photographing process shown in FIG. 7.

If it is determined at step S123 that the first time limit has elapsed, namely, in the case that the object brightness is low, it is determined whether the calculated distance value obtained by the distance measuring calculation using the 4EV sensor data is effective (step S141). If it is determined at step S141 that the calculated distance value is effective, control proceeds to step S155.

If it is determined at step S141 that the calculated distance value is not effective, it is considered that the object brightness is too low, so that the sensitivity of the distance measuring sensor 36 is set at a high sensitivity, the auxiliary AF light projecting circuit 39 starts operating, and the integrating operation in which the distance measuring sensor 36 accumulates (integrates) electric charges is started, while the auxiliary AF light emitter projects a contrast pattern onto the object (step S143). Subsequently, a second time limit is set (step S145). Thereafter the sensor data input process ("Sensor Data Input Process" shown in FIG. 9) is performed (step S147). At this time, in the sensor data input process, the picture signals output from the distance measuring sensor 36 are input to convert each of the input picture signals into a 10-bit digital form (the digital image data), and subsequently the 4EV logarithmic transformation is performed for each of the digital image data to obtain the 4EV sensor data. Note that the second time limit set at step S145 is predetermined to be longer than the first time limit.

Thereafter, the distance measuring calculation is again performed using the 4EV sensor data obtained at step S147 (step S149). Subsequently, it is determined whether the calculated distance value obtained by the distance measuring calculation is effective (step S151). If it is determined at step S151 that the calculated distance value is not effective, the distance measurement error flag is set to 1 (step S153), and then control returns to the photographing process shown in FIG. 7. If it is determined at step S151 that the calculated distance value is effective, control proceeds to step S155 at which the distance measurement error flag is set to 0. Subsequently, the effective calculated value is established (step S157). Thereafter, the aforementioned LL data is calculated in accordance with the fixed calculated distance value (step S159). Subsequently, the lens drive process is performed in accordance with the calculated LL data (step S161). Thereafter control returns to the photographing process shown in FIG. 7.

Figure 9:
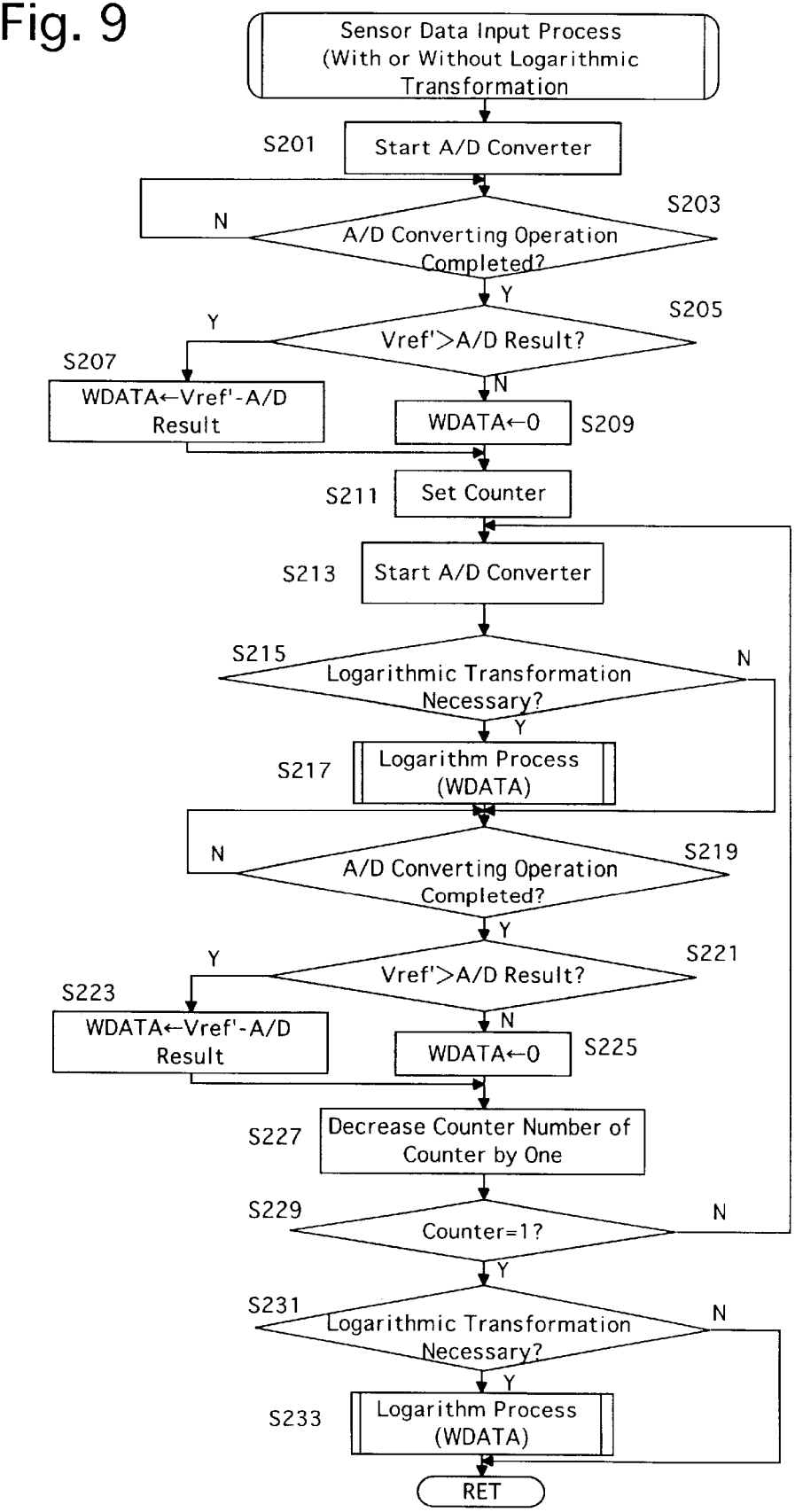
FIG. 9 is a flow chart showing the sensor data input process performed in the distance measuring process shown in FIG. 8.

The sensor data input process performed at steps S107, S119, S133 and S147 will be hereinafter discussed in detail with reference to the flow chart shown in FIG. 9 and the graph shown in FIG. 6B. In the sensor data input process, firstly, the A/D converter 21a is started to convert the picture signal that is input first from the photodiodes 36c of the distance measuring sensor 36 into a 10-bit digital form, so as to obtain the corresponding digital image data (step S201). The lower the object brightness, the greater the picture signal and the corresponding digital image data (A/D value), as can be seen in FIG. 6B. Subsequently, it is determined whether the A/D converter 21a has completed the A/D converting operation thereof for the first input picture signal (step S203). Upon completion of the A/D conversion in the operation at step S201, it is determined whether the value of the digital image data is smaller than the A/D converted value (10-bit digital form) of the reference voltage Vref' (step S205). In the illustrated embodiment, the value of zero volts (0V) and the value of the 10-bit digital form of the reference voltage Vref' are determined to be 0 and 1023, respectively.

If it is determined at step S205 that the digital image data is smaller than the A/D converted value of the reference voltage Vref', the value obtained by subtracting the value of the digital image data from the value of the 10-bit digital form of the reference voltage Vref' is stored in the RAM 21c as a WDATA value (step S207). If it is determined at step S205 that the digital image data is equal to or greater than the A/D converted value of the reference voltage Vref', 0 (zero) is stored in the RAM 21c as the WDATA value (step S209). Hence, the WDATA value becomes smaller as the object brightness of the corresponding portion becomes lower.

Subsequently, the counter 21b is set to the total number of items of the digital image data (step S211). Subsequently the A/D converter 21a is started to convert the picture signal that is subsequently input from each subsequent photodiode 36c of the distance measuring sensor 36 into a 10-bit digital form so as to obtain corresponding digital image data (step S213). Subsequently it is determined whether the 4EV logarithmic transformation needs to be performed for the digital image data (step S215). If it is determined at step S215 that the 4EV logarithmic transformation needs to be performed for the digital image data, i.e., if control has entered the sensor data input process at step S107, S119 or S147, a logarithmic process ("Logarithm Operation" shown in FIG. 10) is performed during the time the subsequent picture signal is input and converted into a 10-bit digital form (step S217). In the logarithmic process, in the distance measuring process performed in the first embodiment of the photographing process, the 4EV logarithmic transformation is performed for the WDATA value stored in the RAM 21c at step S207 or S209, so as to obtain the corresponding 4EV sensor data (8-bit data) by converting the WDATA value into a corresponding 8-bit data. If it is determined at step S215 that the 4EV logarithmic transformation does not need to be performed for the digital image data (i.e., step S133), control skips step S217 to proceed to step S219 at which it is determined whether the A/D converter 21a has completed the A/D converting operation thereof for the current picture signal (step S219). If it is determined at step S219 that the A/D converter 21a has not yet completed, the A/D converting operation thereof for the current picture signal, control repeats the operation at step S219 to wait for the A/D converter 21a to complete the A/D converting operation thereof for the current picture signal. Furthermore, in the case where the logarithmic process is performed at step S217, the steps S213 through S219 allows the A/D converter 21a to convert the current picture signal while the logarithmic process is simultaneously performed.

If it is determined at step S219 that the A/D converter 21a has completed the A/D converting operation thereof for the current picture signal, operations similar to the operations at steps S205, S207 and S209 are performed. Namely, it is determined at step S221 whether the value of the digital image data is smaller than the A/D converted value (10-bit digital form) of the reference voltage Vref'. If it is determined at step S221 that the digital image data is smaller than the A/D converted value of the reference voltage Vref', the value obtained by subtracting the value of the digital image data from the value of the 10-bit digital form of the reference voltage Vref' is stored in the RAM 21c as the WDATA value (step S223). If it is determined at step S221 that the digital image data is equal to or greater than the A/D converted value of the reference voltage Vref', 0 (zero) is stored in the RAM 21c as the WDATA value (step S225). After the operation at step S223 or S225, the counter value of the counter 21b is decreased by one (step S227). Subsequently, it is determined whether the counter value of the counter 21b is 1 (step S229). If it is determined at step S229 that the counter value of the counter 21b is not 1, control returns to step S213 so that the operations at step S213 through step S227 are repeated. If it is determined at step S229 that the counter value of the counter 21b is 1, it is determined whether the 4EV logarithmic transformation needs to be performed for the last digital image data (step S231). If it is determined at step S231 that the 4EV logarithmic transformation needs to be performed for the digital image data, the logarithmic process ("Logarithm Operation" shown in FIG. 10) is performed at step S233 in which the 4EV logarithmic transformation is performed for the digital image data obtained at the time the counter value of the counter 21b is 2, namely, for the last converted digital image data so as to obtain the corresponding 4EV sensor data (8-bit data). Thereafter control returns to the distance measuring process shown in FIG. 8. If it is determined at step S231 that the 4EV logarithmic transformation does not need to be performed for the digital image data, control skips step S233 and returns to the distance measuring process shown in FIG. 8.

Figure 10:
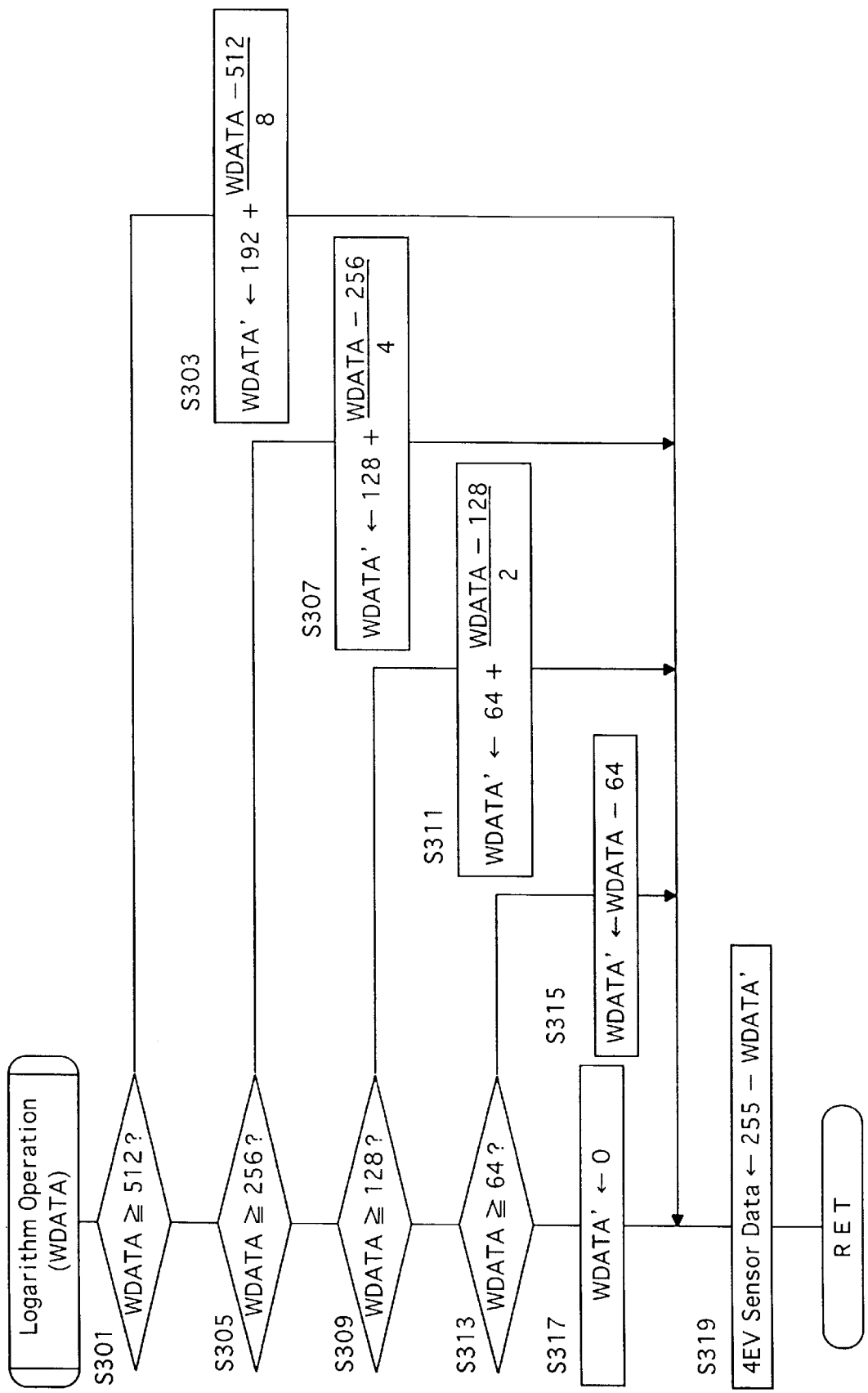
FIG. 10 is a flow chart showing the logarithmic process performed in the sensor data input process shown in FIG. 9.

The logarithmic process performed at steps S217 and S233 will be hereinafter discussed in detail with reference to the flow chart shown in FIG. 10 and the graphs shown in FIGS. 6B and 6C. In the logarithmic process, the 4EV logarithmic transformation is performed for each of the digital image data to obtain the corresponding 8-bit 4EV sensor data.

In the logarithmic process, firstly, it is determined whether the WDATA value is equal to or greater than 512 (step S301). If the WDATA value is equal to or greater than 512, the value obtained by a formula "192+(WDATA value−512)/8" is determined herein as a WDATA' value (step S303), and then the value obtained by subtracting the WDATA' value from 255 is stored in the RAM 21c as the 4EV sensor data (step S319). Thereafter control returns to the sensor data input process shown in FIG. 9.

If it is determined at step S301 that the WDATA value is not equal to or greater than 512, i.e., the WDATA value is smaller than 512, control proceeds to step S305 at which it is determined whether the WDATA value is equal to or greater than 256. If the WDATA value is equal to or greater than 256, the value obtained by a formula "1128+(WDATA value−256)/4" is determined herein as the WDATA' value (step S307), and then the value obtained by subtracting the WDATA' value from 255 is stored in the RAM 21c as the 4EV sensor data (step S319). Thereafter control returns to the sensor data input process shown in FIG. 9.

If it is determined at step S305 that the WDATA value is not equal to or greater than 256, i.e., the WDATA value is smaller than 256, control proceeds to step S309 at which it is determined whether the WDATA value is equal to or greater than 128. If the WDATA value is equal to or greater than 128, the value obtained by a formula "64+(WDATA value−128)/2" is determined herein as the WDATA' value (step S311), and then the value obtained by subtracting the WDATA' value from 255 is stored in the RAM 21c as the 4EV sensor data (step S319). Thereafter control returns to the sensor data input process shown in FIG. 9.

If it is determined at step S309 that the WDATA value is not equal to or greater than 128, i.e., the WDATA value is smaller than 128, control proceeds to step S313 at which it is determined whether the WDATA value is equal to or greater than 64. If the WDATA value is equal to or greater than 64, the value obtained by a formula "WDATA−64" is determined herein as the WDATA' value (step S315), and then the value obtained by subtracting the WDATA' value from 255 is stored in the RAM 21c as the 4EV sensor data (step S319). Thereafter control returns to the sensor data input process shown in FIG. 9.

If it is determined at step S313 that the WDATA value is not equal to or greater than 64, i.e., the WDATA value is smaller than 64, control proceeds to step S317 at which the WDATA' value is determined herein as 0, and then the value obtained by subtracting the WDATA' value from 255 is stored in the RAM 21c as the 4EV sensor data (step S319). Thereafter control returns to the sensor data input process shown in FIG. 9. Therefore, in FIG. 6C, the 4EV sensor data corresponding to the digital image data on any photodiode of which the object brightness is lower than that of the digital image data on the photodiode (36c) "a" is 255.

According to the 4EV logarithmic transformation as described above, the resolving power of the low-brightness portion can be made substantially equal to the resolving power of a high-brightness portion by increasing the resolving power of a low-brightness portion. Consequently, 4EV sensor data having a distinct contrast can be obtained. Accordingly, a proper calculated distance value can be obtained by the distance measuring calculation using the 4EV sensor data even if a desired object image to be photographed is positioned in a low-brightness portion of the digital image data.

As can be understood from the foregoing, according to the distance measuring process performed in the first embodiment of the photographing process, firstly, the distance measuring calculation is performed using the 4EV sensor data, obtained by firstly converting the analogue picture signal into the digital image data, and secondly converting the digital image data into the 8-bit 4EV sensor data. Thereafter, if the calculated distance value obtained by the distance measuring calculation using the 4EV sensor data is not effective, and if there is only a little difference in image contrast in a high-brightness portion of the 4EV sensor data, the distance measuring calculation is performed using the digital image data, rather than the 4EV sensor data; namely, the 4EV logarithmic transformation for each of the digital image data is not performed, so that the distance measuring calculation can be performed using data having a distinct image contrast, which improves the accuracy of measurement. Namely, since the resolving power in a low-brightness portion of the digital image data increases according to the distance measuring calculation using the 4EV sensor data, a proper calculated distance value can be obtained by the distance measuring calculation even if a desired object image to be photographed is positioned in a low-brightness portion of the digital image data. Moreover, since the resolving power in a high-brightness portion of the digital image data according to the distance measuring calculation using the digital image data is higher than when using the 4EV sensor data, a proper calculated distance value can be obtained by the distance measuring calculation even if a desired object image to be photographed is positioned in a high-brightness portion of the digital image data. Furthermore, according to the distance measuring calculation using the digital image data, a logarithmic transformation does not have to be performed unnecessarily, which makes it possible to reduce the time necessary for the distance measuring process.

Figure 11:
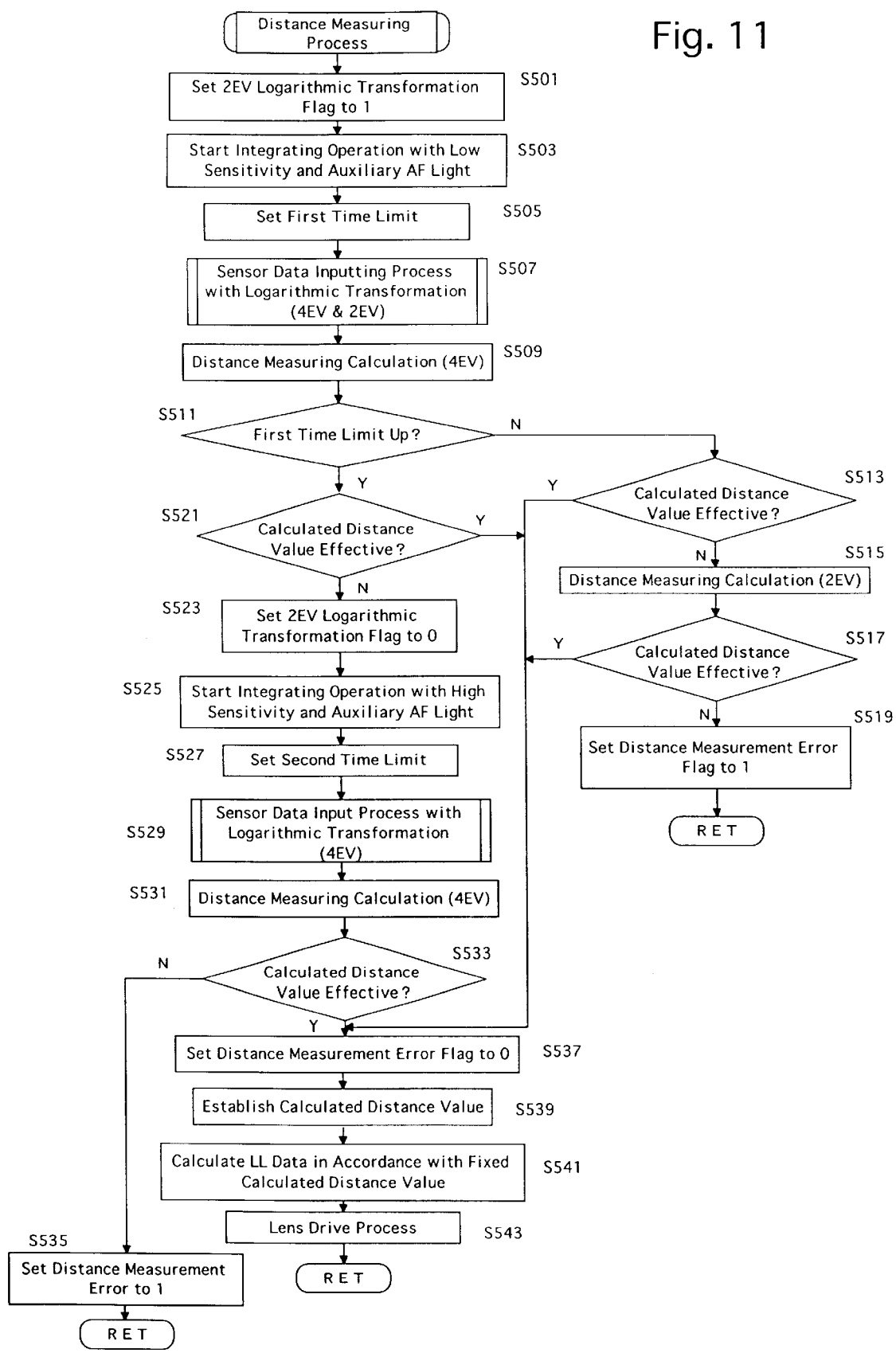
FIG. 11 is a flow chart showing the distance measuring process performed in the second embodiment of the photographing process of the lens-shutter type camera shown in FIG. 1.

A distance measuring process performed in the second embodiment of the photographing process will be hereinafter discussed in detail with reference to FIGS. 11, 12 and 13. The distance measuring process in the second embodiment of the photographing process is identical to the distance measuring process in the first embodiment of the photographing process, in that the distance measuring calculation is performed using the 4EV sensor data to increase the resolving power of a low-brightness portion of the digital image data. The distance measuring process in the second embodiment of the photographing process is different from the distance measuring process in the first embodiment of the photographing process, in that the distance measuring calculation is performed using the digital image data in the case where a proper calculated distance value cannot be obtained by the distance measuring calculation using the 4EV sensor data in the distance measuring process in the first embodiment of the photographing process, whereas the distance measuring calculation is performed using sensor data of a narrow conversion range in the same case in the distance measuring process in the second embodiment of the photographing process.

In the distance measuring process in the second embodiment of the photographing process, firstly, each photodiode 36c of the distance measuring sensor 36 is controlled to accumulate (integrates) electric charges and output the same as picture signals, and then the picture signals are converted into the corresponding digital image data, similar to the distance measuring process in the first embodiment of the photographing process. Subsequently, the 4EV logarithmic transformation is performed for each of the digital image data to obtain the 4EV sensor data as shown in FIG. 6C, and at the same time, the 2EV logarithmic transformation is performed for each of the digital image data to obtain the 2EV sensor data as shown in FIG. 6D. The 4EV sensor data and the 2EV sensor data are stored in the RAM 21c. Thereafter, firstly, the distance measuring calculation is performed using the 4EV sensor data. In this calculation using the 4EV sensor data, an appropriate calculated distance value can be obtained even if a desired object image to be photographed is positioned in a low-brightness portion of the digital image data.

However, if the CPU 21 determines that an appropriate calculated distance value cannot be obtained by the distance measuring calculation using the 4EV sensor data, and that the object brightness is equal to or greater than a predetermined value from the integral time of the distance measuring sensor 36, the distance measuring calculation is performed using the 2EV sensor data. According to this distance measuring calculation using the 2EV sensor data, since the resolving power in a high-brightness portion of the digital image data can be made high by using the 2EV sensor data whose conversion range is narrower than that of the 4EV sensor data, an appropriate calculated distance value can be obtained by the distance measuring calculation even if a desired object image to be photographed is positioned in a high-brightness portion of the digital image data.

In the distance measuring process in the second embodiment of the photographing process, although two conversion ranges (two stages: 4EV and 2EV) are provided, the present invention is not limited solely to these particular conversion ranges. Namely, more than two conversion ranges can be provided. In the case of providing more than two conversion ranges, if a proper calculated distance value cannot be obtained by the distance measuring calculation using one conversion range, another conversion range which is to be used for the subsequent distance measuring calculation can be selected from the remaining conversion ranges in accordance with the calculated distance value obtained with the use of the former conversion range.

The distance measuring process performed in the second embodiment of the photographing process will be hereinafter discussed in detail with reference to FIG. 11. The second embodiment of the photographing process is identical to the first embodiment of the photographing process except for the distance measuring process, therefore only the distance measuring process thereof will be herein discussed.

In the distance measuring process performed in the second embodiment of the photographing process, firstly, a 2EV logarithmic transformation flag is set to 1 (step S501).

Subsequently, the sensitivity of the distance measuring sensor 36 is set to a low sensitivity, the auxiliary AF light projecting circuit 39 starts, and the integrating operation in which each photodiode 36c of the distance measuring sensor 36 accumulates (integrates) electric charges is started, while the auxiliary AF light emitter projects a contrast pattern onto the object (step S503). Subsequently, the first time limit is set (step S505). The aforementioned 2EV logarithmic transformation flag is used to determine whether the 2EV logarithmic transformation needs to be performed for the digital image data in a sensor data input process ("Sensor Data Input Process" shown in FIG. 12). The first time limit corresponds to the aforementioned maximum integration time of the distance measuring sensor 36. Subsequently, the CPU 21 controls each line sensor 36b to stop integrating charges at the time the picture signal Vx (Va, Vb, Vc, Vd or Ve) output from either line sensor 36b reaches zero volt (0V), or the maximum integration time elapses, and then the sensor data input process ("Sensor Data Input Process" shown in FIG. 12) is performed (step (S507). In the sensor data input process shown in FIG. 12, the picture signals output from the distance measuring sensor 36 are input to convert each of the input picture signals into a 10-bit digital form (the digital image data), and subsequently the 4EV logarithmic transformation is performed for each of the digital image data to obtain the 4EV sensor data. Furthermore, the 2EV logarithmic transformation is performed for each of the digital image data to obtain the 2EV sensor data if the 2EV logarithmic transformation flag is 1. In the operation at step S507, both the 4EV logarithmic transformation and the 2EV logarithmic transformation are performed to obtain the 4EV sensor data and the 2EV sensor data, respectively, because the 2EV logarithmic transformation flag is set to 1 at step S501.

Thereafter, the distance measuring calculation is performed using the 4EV sensor data (step S509). Subsequently, it is determined whether the first time limit has elapsed, i.e., whether the predetermined maximum integration time has elapsed (step S511).

If it is determined at step S511 that the first time limit is not up yet, namely, the object brightness is high, it is determined whether the calculated distance value obtained by the distance measuring calculation is effective (step S513). If it is determined at step S513 that the calculated distance value is effective, control proceeds to step S537. In the distance measuring process performed in the second embodiment of the photographing process, the CPU 21 determines that the calculated distance value is effective if the calculated distance value satisfies a predetermined condition, more specifically, if the reliability thereof is equal to or greater than a predetermined reliability. If it is determined at step S511 that the first time limit is not up yet, and if it is determined at step S513 that the calculated distance value is not effective, the distance measuring calculation is again performed using the 2EV sensor data obtained in the sensor data input process at step S507 (step S515). According to this distance measuring calculation performed using the 2EV sensor data, the distance measuring calculation can be performed with a high resolving power in a high-brightness portion of the digital image data. After the operation at step S515, it is determined whether the calculated distance value obtained by the distance measuring calculation is effective (step S517). If it is determined at step S517 that the calculated distance value is effective, control proceeds to step S537. If it is determined at step S517 that the calculated distance value is not effective, the distance measurement error flag is set to 1 (step S519) and then control returns to the photographing process shown in FIG. 10.

If it is determined at step S511 that the first time limit is up, namely, the object brightness is low, it is determined whether the calculated distance value obtained by the distance measuring calculation using the 4EV sensor data is effective (step S521). If it is determined at step S521 that the calculated distance value is effective, control proceeds to step S537. If it is determined at step S511 that the first time limit is up and if it is determined at step S521 that the calculated distance value is not effective, it is considered that the object brightness is too low, so that the 2EV logarithmic transformation flag is set to 0 (step S523), and subsequently the sensitivity of the distance measuring sensor 36 is set to a high sensitivity, the auxiliary AF light projecting circuit 39 starts operating, and the integrating operation in which the distance measuring sensor 36 accumulates (integrates) electric charges is started while the auxiliary AF light emitter projects a contrast pattern onto the object (step S525). Subsequently, a second time limit is set (step S527). Thereafter the sensor data input process ("Sensor Data Input Process" shown in FIG. 12) is performed (step S529). Note that the second time limit set at step S145 is predetermined to be longer than the first time limit.

After the sensor data input process is performed at step S529, the distance measuring calculation is again performed using the 4EV sensor data obtained at step S529 (step S531). Subsequently, it is determined whether the calculated distance value obtained by the distance measuring calculation is effective (step S533). If it is determined at step S533 that the calculated distance value is not effective, the distance measurement error flag is set to 1 (step S535), and then control returns to the photographing process shown in FIG. 10. If it is determined at step S533 that the calculated distance value is effective, control proceeds to step S537 at which the distance measurement error flag is set to 0. Subsequently, the effective calculated value is established (step S539). Thereafter, the aforementioned LL data (i.e., the number of pulses for driving the focus motor 30) is calculated in accordance with the fixed calculated distance value (step S541). Subsequently, the lens drive process is performed in accordance with the calculated LL data (step S543). Thereafter control returns to the photographing process shown in FIG. 10.

Figure 12:
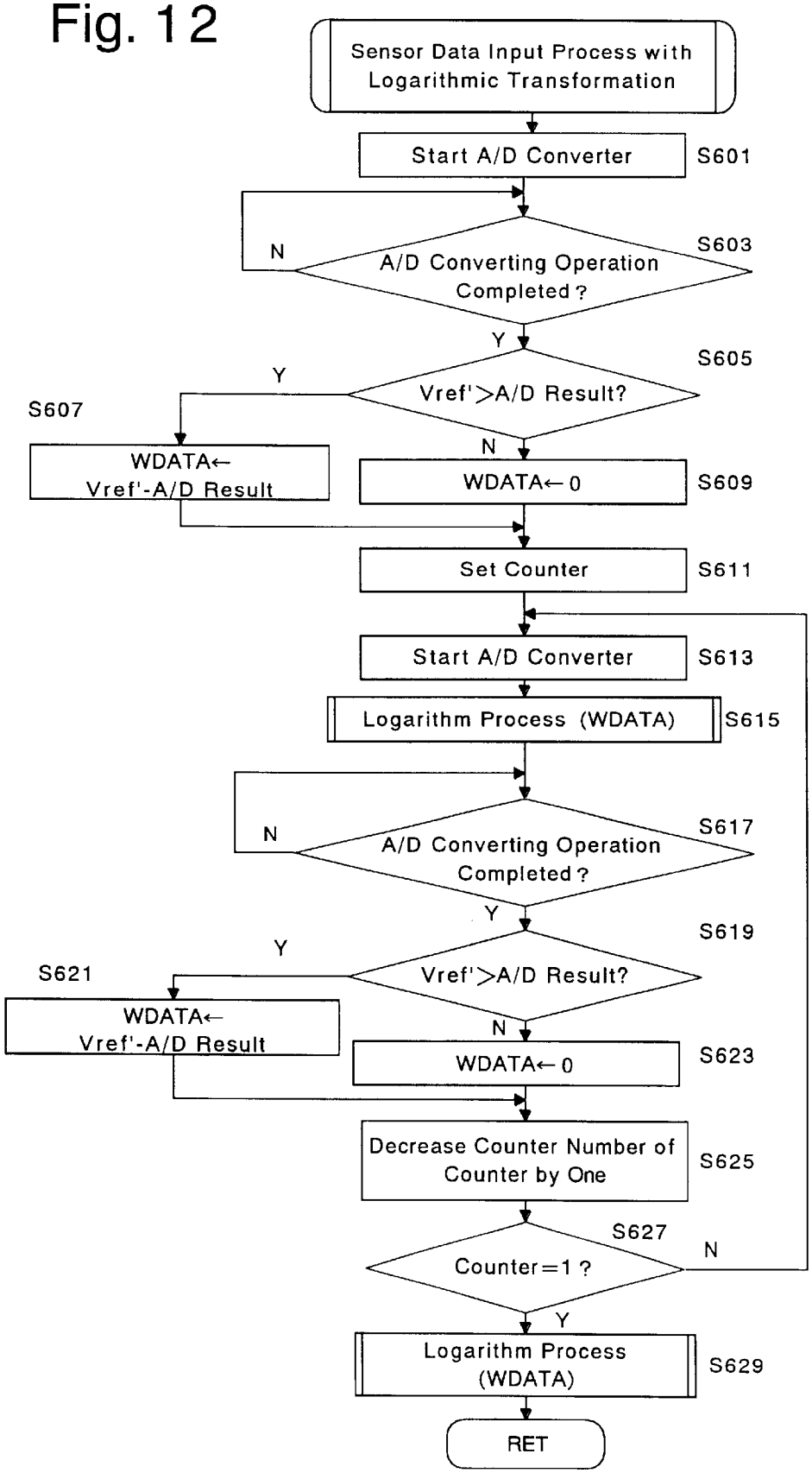
FIG. 12 is a flow chart showing the sensor data input process performed in the distance measuring process shown in FIG. 11.

FIG. 12 is a flow chart showing the sensor data input process in the distance measuring process in the second embodiment of the photographing process. The sensor data input process shown in FIG. 12 is substantially the same to that shown in FIG. 9 in the first embodiment of the photographing process except that operations which correspond to the operations at steps S215 and S231 are not provided in the sensor data input process shown in FIG. 12. Namely, the steps S601, S603, S605, S607, S609, S611, S613, S615, S617, S619, S621, S623, S625, S627 and S629 correspond to steps S201, S203, S205, S207, S209, S211, S213, S217, S219, S221, S223, S225, S227, S229 and S233, respectively. accordingly, the details of the sensor data input process shown in FIG. 12 is not herein discussed.

The logarithmic process performed at steps S615 and S629 will be hereinafter discussed in detail with reference to the flow chart shown in FIG. 13. In this logarithmic process, the 4EV logarithmic transformation is performed for each of the 10-bit digital image data to obtain the corresponding 8-bit 4EV sensor data, while the 2EV logarithmic transformation is performed for each of the 10-bit digital image data to obtain the corresponding 8-bit 2EV sensor data.

Figure 13:
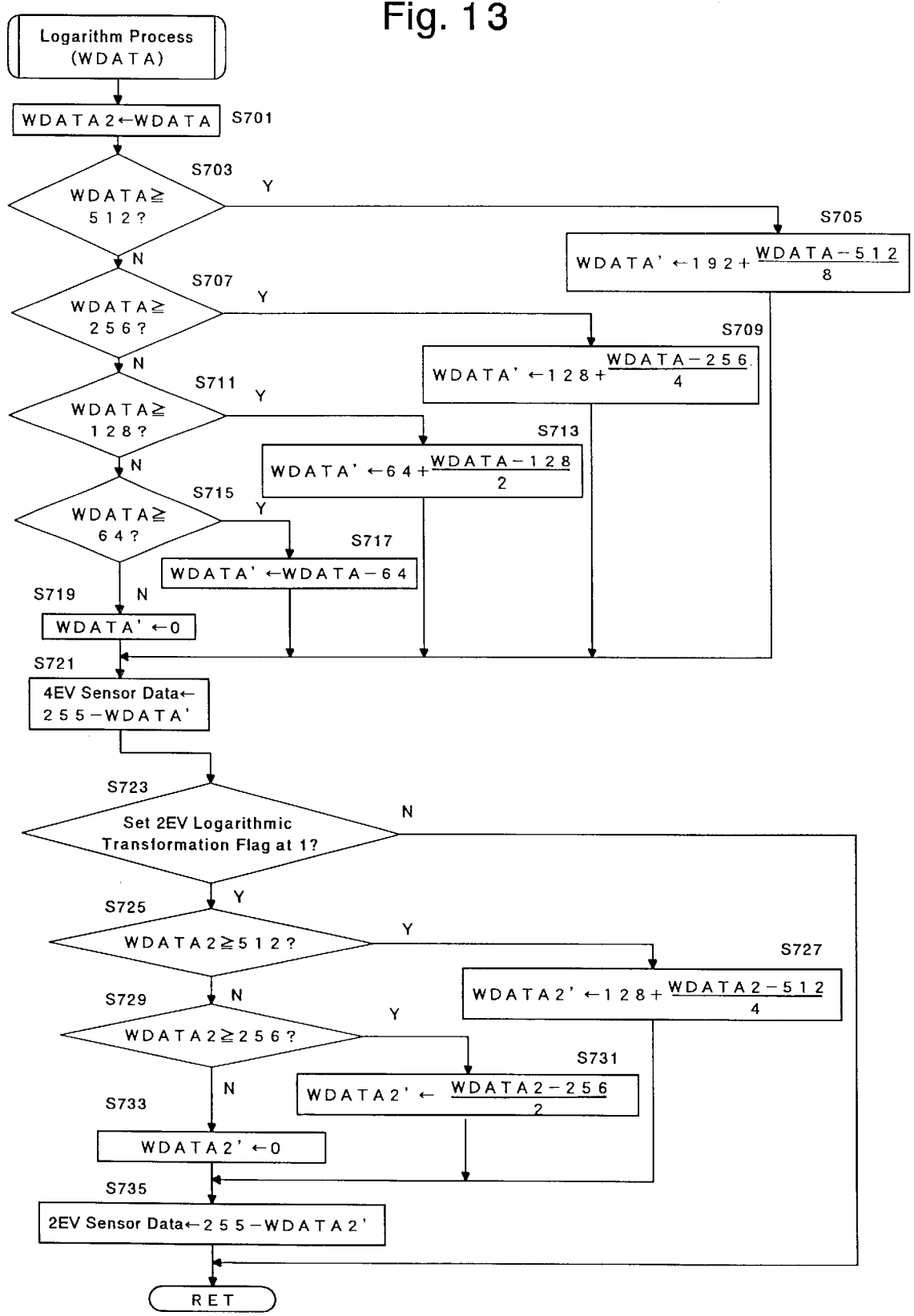
FIG. 13 is a flow chart showing the logarithmic process performed in the sensor data input process shown in FIG. 12.

In the logarithmic process shown in FIG. 13, firstly, the WDATA value is stored in the RAM 21c as a WDATA2 value (step S701). Subsequently, the 4EV logarithmic transformation is performed (steps S703 through S721). The operations at steps S703 through S721 are identical to the operations at steps S301 through S319 and thus is not herein discussed. According to the 4EV logarithmic transformation performed at steps S703 through S721, the resolving power of a low-brightness portion can be made high so that the resolving power of the low-brightness portion can be substantially equal to the resolving power of a high-brightness portion. Consequently, 4EV sensor data having a distinct contrast which makes it easy to detect a focus state can be obtained. Accordingly, a proper calculated distance value can be obtained by the distance measuring calculation using the 4EV sensor data even if a desired object image to be photographed is positioned in a low-brightness portion of the digital image data.

After the 4EV logarithmic transformation at steps S703 through S721 ends, i.e., after the operation at step S721 is performed, it is determined whether the 2EV logarithmic transformation flag is 1 (step S723). If it is determined at step S723 that the 2EV logarithmic transformation flag is not 1, control returns to the sensor data input process shown in FIG. 12 without performing the 2EV logarithmic transformation. If it is determined at step S723 that the 2EV logarithmic transformation flag is 1, namely, if control enters from the sensor data input process at step S507 to the logarithmic process, the 2EV logarithmic transformation at steps S725 through S735 is performed.

When the 2EV logarithmic transformation at steps S725 through S735 is performed, firstly, it is determined whether the WDATA2 value is equal to or greater than 512 (step S723). If the WDATA2 value is equal to or greater than 512, the value obtained by a formula "128+(WDATA2 value−512)/4" is determined herein as a WDATA2' value (step S727), and then the value obtained by subtracting the WDATA2' value from 255 is stored in the RAM 21c as the 2EV sensor data (step S735). Thereafter control returns to the sensor data input process shown in FIG. 12.

If it is determined at step S725 that the WDATA2 value is not equal to or greater than 512, i.e., the WDATA2 value is smaller than 512, control proceeds to step S729 at which it is determined whether the WDATA2 value is equal to or greater than 256. If the WDATA2 value is equal to or greater than 256, the value obtained by a formula "WDATA2 value−256)/2" is determined herein as the WDATA2' value (step S731), and then the value obtained by subtracting the WDATA2' value from 255 is stored in the RAM 21c as the 2EV sensor data (step S735). Thereafter-control returns to the sensor data input process shown in FIG. 12.

If it is determined at step S729 that the WDATA2 value is not equal to or greater than 256, i.e., the WDATA value is smaller than 256, control proceeds to step S733 at which the WDATA2' value is determined herein as 0 and then the value obtained by subtracting the WDATA2' value from 255 is stored in the RAM 21c as the 2EV sensor data (step S735). Thereafter control returns to the sensor data input process shown in FIG. 12. Therefore, in FIG. 6D, the 2EV sensor data corresponding to the digital image data on any photodiode (36c) (each of the photodiodes "a" and "b") of which the object brightness is lower than that of the digital image data on the photodiode "c" is 255.

According to the 2EV logarithmic transformation at steps S723 through S735 as described above, the resolving power of a high-brightness portion can be made high. Accordingly, an appropriate calculated distance value can be obtained by the distance measuring calculation at step S515 using the 2EV sensor data even if a desired object image to be photographed is positioned in a high-brightness portion of the digital image data.

As can be understood from the foregoing, according to the distance measuring process performed in the second embodiment of the photographing process, firstly, the distance measuring calculation is performed using the 4EV sensor data. Thereafter, if the calculated distance value obtained by the distance measuring calculation using the 4EV sensor data is not effective, and if the object brightness is equal to or greater than a predetermined value, the distance measuring calculation is performed using the 2EV sensor data whose conversion range is narrower than that of the 4EV sensor data. Accordingly, the sensor data that is suitable to the object brightness is used in the distance measuring calculation, which improves the accuracy of measurement. In other words, according to the distance measuring calculation using the 4EV logarithmic transformation, the resolving power of the low-brightness portion can be made substantially equal to the resolving power of a high-brightness portion by increasing the resolving power of a low-brightness portion. Consequently, an appropriate calculated distance value can be obtained by the distance measuring calculation using the 4EV sensor data even if a desired object image to be photographed is positioned in a low-brightness portion of the digital image data. On the other hand, according to the distance measuring calculation using the 2EV logarithmic transformation, since the resolving power of a high-brightness portion becomes higher than that according to the distance measuring calculation using the 4EV logarithmic transformation, a proper calculated distance value can be obtained by the distance measuring calculation using the 2EV sensor data even if a desired object image to be photographed is positioned in a high-brightness portion of the digital image data.

According to the second embodiment of the photographing process, firstly an analogue picture signal is converted into the corresponding digital image data (first digital image data), and secondly the subsequent analogue picture signal is converted into the corresponding digital image data during the time each of the 4EV logarithmic transformation and the 2EV logarithmic transformation is performed for the first digital image data, so that the time necessary for the A/D conversion process and each of the 4EV logarithmic transformation and the 2EV logarithmic transformation is reduced. Furthermore, since more than one sensor data of different conversion ranges are obtained from the same digital image data obtained by a single integrating operation and then the more than one sensor data thereof is stored in the RAM 21c, the distance measuring process does not need to be performed each time the sensor data (the conversion range of the sensor data), which is to be used in the distance measuring calculation, is altered. This reduces the operation time of the distance measuring sensor 36 to thereby reduce the power consumption.

Although the logarithmic transformation is performed so that 10-bit digital image data is compressed into 8-bit data, the present invention is not limited solely to this particular embodiment. For instance, the logarithmic transformation can be performed so that 10-bit digital image data is converted into another 10-bit data, or the logarithmic transformation can be performed so that 8-bit digital image data is converted into another 8-bit data.

Each of the first and second embodiments can be applied to a multi-point distance measuring apparatus. In this case, the integrating operations of all the distance measuring zones need to stop at the time one of the picture signals reaches the integration completion value (voltage) or the predetermined maximum integration time elapses, and thereafter the aforementioned sensor data input process needs only to be performed for each distance measuring zone.

Although the illustrated embodiment is applied to a passive-type distance measuring apparatus provided in a lens shutter type AF camera, the illustrated embodiment can be applied to a passive-type distance measuring apparatus provided in an SLR AF camera.

As can be understood from the foregoing, according to the first embodiment of the photographing process, since the distance measuring device includes the distance measuring sensor (light receiving device) 36 having at least one array of photoelectric conversion elements, wherein each of the photoelectric conversion elements converts light received thereon into an electric charge and accumulates the electric charge so that each accumulated electric charge is output in order from each photoelectric conversion element as an electrical picture signal of the distance measuring sensor; an A/D converter which converts the picture signal into digital image data; a converting device (i.e., the CPU 21) which performs a logarithmic transformation on the digital image data to replace the digital image data with sensor data; and an operation device (i.e., the CPU 21) which performs a distance measuring calculation in accordance with the sensor data, the resolving power in a low-brightness portion of the digital image data increases according to the distance measuring calculation using the sensor data, so that an appropriate calculated distance value can be obtained by the distance measuring calculation even if a desired object image to be photographed is positioned in a low-brightness portion of the digital image data.

In the case where the determining device (CPU 21) determines that the calculated distance value is not effective, that the contrast in the portion of the sensor data is lower than the predetermined contrast and that the object brightness is equal to or greater than the predetermined object brightness, the prohibiting device (CPU 21) prohibits the converting device from performing a logarithmic transformation for the digital image data, so that a second picture signal that is output from the light receiving device is converted into second digital image data without performing the logarithmic transformation for the digital image data, wherein each of the photoelectric conversion elements accumulates the electric charge again so as to output the second picture signal, and the operation device performs the distance measuring calculation again in accordance with the second picture signal, the resolving power in a high-brightness portion of the digital image data increases which improves the accuracy of measurement, while an appropriate calculated distance value can be obtained by the distance measuring calculation even if a desired object image to be photographed is positioned in a high-brightness portion of the digital image data.

According to the second embodiment of the photographing process, since if an effective calculated distance value cannot be obtained by the distance measuring calculation using a first sensor data, the operation device performs the distance measuring calculation again using another sensor data of more than one sensor data, and since a conversion range in which one logarithmic transformation is performed for the first sensor data is different from a conversion range in which another logarithmic transformation is performed for another sensor data, the accuracy of measurement improves. Moreover, a proper calculated distance value can be obtained even if a desired object image to be photographed is positioned in either a low-brightness portion or a high-brightness portion of the digital image data.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A distance measuring apparatus comprising:

a light receiving device comprising at least one array of photoelectric conversion elements, wherein each of said photoelectric conversion elements converts light received thereon into an electric charge and accumulates the electric charge so that the accumulated electric charge is output in order from each photoelectric conversion element as an electrical picture signal;

an A/D converter which converts the picture signal into digital image data;

a converting device which performs a logarithmic transformation on the digital image data to replace the digital image data with sensor data;

an operation device which performs a distance measuring calculation in accordance with the sensor data;

a determining device which determines whether the calculated distance is effective, whether a contrast in a portion of the sensor data is equal to or higher than a predetermined contrast value and whether an object brightness is equal to or greater than a predetermined object brightness value, in accordance with the sensor data; and a prohibiting device which prohibits said converting device from performing the logarithmic transformation on the digital image data when said determining device determines that the calculated distance value is not effective, that the contrast in the portion of the sensor data is lower than the predetermined contrast value and that the object brightness is equal to or greater than the predetermined object brightness value;

wherein, when said converting device is prohibited from performing the logarithmic transformation on the digital image data, a second picture signal output from said light receiving device is converted into second digital image data and, without the logarithmic transformation being performed on the second digital image data, the distance measuring calculation is performed in accordance with the second picture signal.

2. The distance measuring apparatus according to claim 1, further comprising a memory in which each of said sensor data is stored.

3. The distance measuring device according to claim 1, wherein when said A/D converter converts the subsequent picture signals into the second digital image data, said converting device simultaneously receives the first digital image data and performs a logarithmic transformation on the first digital image data.

4. The distance measuring device according to claim 1, wherein after said A/D converter has finished converting all of the picture signals, said converting device performs a logarithmic transformation on the second digital image data corresponding to a final picture signal.

5. The distance measuring apparatus according to claim 1, wherein said light receiving device comprises a passive AF sensor.

6. The distance measuring apparatus according to claim 1, wherein said distance measuring apparatus is incorporated in an AF camera.

7. A distance measuring apparatus comprising:

a light receiving device having at least one array of photoelectric conversion elements, wherein each of said photoelectric conversion elements converts light received thereon into an electric charge and accumulates said electric charge so that each said accumulated electric charge is output in order from each said photoelectric conversion element as an electrical picture signal of said light receiving device;

an A/D converter which converts said picture signal into digital image data;

a converting device which performs more than one logarithmic transformation for said digital image data in different conversion ranges to replace said digital image data with corresponding more than one sensor data of different conversion ranges; and an operation device which performs a distance measuring calculation in accordance with at least one of said more than one sensor data of different conversion ranges;

wherein, if an effective calculated distance value cannot be obtained by said distance measuring calculation using a first one of said more than one sensor data of different conversion ranges, said operation device performs said distance measuring calculation again using another one of said more than one sensor data of different conversion ranges, and wherein a conversion range in which one of said more than one logarithmic transformation is performed for said first one of said more than one sensor data is different from a conversion range in which another one of said more than one logarithmic transformation is performed for said another one of said more than one sensor data.

8. The distance measuring apparatus according to claim 7, further comprising a determining device which determines whether an object brightness is equal to or greater than a predetermined object brightness from an integral time of said light receiving device;

wherein, if said determining device determines that a calculated distance value obtained by said distance measuring calculation using said first one of said more than one sensor data is not effective and that said object brightness is equal to or greater than said predetermined value, said operation device performs said distance measuring calculation again using a second one of said more than one sensor data, and wherein a conversion range in which a second one of said more than one logarithmic transformation is performed for said second one of said more than one sensor data is narrower than a conversion range in which a first one of said more than one logarithmic transformation is performed for said first one of said more than one sensor data.

9. The distance measuring apparatus according to claim 7, wherein said converting device converts said picture signal into said digital image data and performs only said first one of said more than one logarithmic transformation for said digital image data if said object brightness is equal to or greater than said predetermined value at the time said light receiving element converts said picture signal into said digital image data.

10. The distance measuring apparatus according to claim 7, wherein said converting device performs said more than one logarithmic transformation for said digital image data in different conversion ranges in a predetermined range in which the voltage of one of said digital image data which has the highest object brightness among said digital image data is determined as a reference value.

11. The distance measuring apparatus according to claim 7, wherein said A/D converter inputs each said picture signal in series, to subsequently convert a current picture signal of said each picture signal into first digital image data, wherein said converting device subsequently inputs said first digital image data to perform a logarithmic transformation on said first digital data to convert said first image data into sensor data while said A/D converter converts a subsequent picture signal of said each picture signal into second digital image data.

12. The distance measuring apparatus according to claim 11, wherein when said A/D converter converts said picture signals into said second digital image data, said converting device simultaneously inputs said first digital image data and performs a logarithmic transformation on said first digital image data.

13. The distance measuring apparatus according to claim 11, wherein after said A/D converter has finished converting all of said picture signals, said converting device performs a logarithmic transformation on said second digital image data corresponding to the final said picture signal.

14. The distance measuring apparatus according to claim 7, wherein said light receiving device comprises a passive AF sensor.

15. The distance measuring apparatus according to claim 7, wherein said distance measuring apparatus is incorporated in an AF camera.

16. An AF camera comprising:
a passive AF sensor comprising at least one array of photoelectric conversion elements, wherein each of said photoelectric conversion elements converts light received thereon into an electric charge and accumulates the electric charge so that the accumulated electric charges are output from each photoelectric conversion element as an electrical picture signal;
a converting device which converts the picture signal into digital image data and performs a logarithmic transformation for the digital image data to replace the digital image data with sensor data;
an operation device which calculates an amount of defocus in accordance with the sensor data;
a determining device which determines whether the calculated defocus is effective, whether a contrast in a portion of the sensor data is equal to or higher than a predetermined contrast value and whether an object brightness is equal to or greater than a predetermined object brightness value, in accordance with the sensor data; and
a prohibiting device which prohibits said converting device from performing the logarithmic transformation on the digital image data when said determining device determines that the calculated defocus value is not effective, that the contrast in the portion of the sensor data is lower than the predetermined contrast value and that the object brightness is equal to or greater than the predetermined object brightness value;
wherein, when said converting device is prohibited from performing the logarithmic transformation on the digital image data, a second picture signal output from said light receiving device is converted into second digital image data and, without the logarithmic transformation being performed on the second digital image data, the defocus calculation is performed in accordance with the second picture signal.

17. A distance measuring apparatus comprising:
a light receiving device comprising a plurality of photoelectric conversion elements, each photoelectric conversion element converting received light into an electric charge, accumulating the electric charge and outputting the accumulated electric charge as a picture signal;
an A/D converter which receives the picture signal from each of said photoelectric conversion elements, in series, and converts the picture signal into corresponding digital image data;
a converting device which performs a logarithmic transformation on the digital image data to produce sensor data; and
an operation device which performs a distance measuring calculation in accordance with the sensor data;
wherein said A/D converter converts a current picture signal of each picture signal into first digital image data and, while said converting device performs the logarithmic transformation on the first digital image, converts a subsequent picture signal of each picture signal into second digital image data.

18. A distance measuring apparatus comprising:
a light receiving device comprising at least one array of photoelectric conversion elements, each of said photoelectric conversion elements converting received light into an electric charge, accumulating the electric charge and outputting the accumulated electric charge as a picture signal;
an A/D converter which converts the picture signal from each of said photoelectric conversion elements into digital image data;
a converting device which performs a plurality of logarithmic transformations on the digital image data to replace the digital image data with a corresponding plurality of sensor data, the plurality of logarithmic transformations comprising different conversion ranges; and
an operation device which sequentially performs a distance measuring calculation in accordance with the plurality of sensor data until an accurate calculated distance is obtained.

19. The distance measuring apparatus according to claim 18, in which said converting device performs at least a 4EV logarithmic transformation and a 2EV logarithmic transformation to replace the digital image data with 4EV sensor data and 2EV sensor data, respectively.

20. The distance measuring apparatus according to claim 18, in which the accurate calculated distance is obtained when an in-focus state is detected based on one of the plurality of sensor data.

21. A distance measuring apparatus comprising:
a light receiving device comprising at least one array of photoelectric conversion elements, wherein each of said photoelectric conversion elements converts light received thereon into an electric charge and accumulates the electric charge so that the accumulated electric charge is output in order from each photoelectric conversion element as an electrical picture signal;
an A/D converter which converts the picture signal into digital image data;
a converting device which performs a logarithmic transformation on the digital image data to replace the digital image data with sensor data;
an operation device which performs a distance measuring calculation with respect to a target object in accordance with the sensor data;

a determining device which determines whether the calculated distance is usable based on at least one light condition of the target object, in accordance with the sensor data; and a prohibiting device which prohibits said converting device from performing the logarithmic transformation on the digital image data when said determining device determines that the calculated distance value is not usable;

wherein, when said converting device is prohibited from performing the logarithmic transformation on the digital image data, a second picture signal output from said light receiving device is converted into second digital image data and, without the logarithmic transformation being performed on the second digital image data, the distance measuring calculation is performed in accordance with the second picture signal.

22. An AF camera comprising:

a passive AF sensor comprising at least one array of photoelectric conversion elements, wherein each of said photoelectric conversion elements converts light received thereon into an electric charge and accumulates the electric charge so that the accumulated electric charges are output from each photoelectric conversion element as an electrical picture signal;

a converting device which converts the picture signal into digital image data and performs a logarithmic transformation for the digital image data to replace the digital image data with sensor data;

an operation device which calculates an amount of defocus with respect to a target object in accordance with the sensor data;

a determining device which determines whether the calculated amount of defocus is usable based on at least one light condition of the target object, in accordance with the sensor data; and a prohibiting device which prohibits said converting device from performing the logarithmic transformation on the digital image data when said determining device determines that the calculated amount of defocus is not usable;

wherein, when said converting device is prohibited from performing the logarithmic transformation on the digital image data, a second picture signal output from said light receiving device is converted into second digital image data and, without the logarithmic transformation being performed on the second digital image data, the defocus calculation is performed in accordance with the second picture signal.

\* \* \* \* \*